US012489927B2

(12) United States Patent
Hu

(10) Patent No.: US 12,489,927 B2
(45) Date of Patent: Dec. 2, 2025

(54) FILE DECAPSULATION METHOD AND APPARATUS FOR FREE VIEWPOINT VIDEO, DEVICE, AND STORAGE MEDIUM

(71) Applicant: Tencent Technology (Shenzhen) Company Limited, Guangdong (CN)

(72) Inventor: Ying Hu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 142 days.

(21) Appl. No.: 18/239,654

(22) Filed: Aug. 29, 2023

(65) Prior Publication Data

US 2023/0403411 A1 Dec. 14, 2023

Related U.S. Application Data

(63) Continuation of application No. PCT/CN2022/109521, filed on Aug. 1, 2022.

(30) Foreign Application Priority Data

Aug. 10, 2021 (CN) .......................... 202110913912.8

(51) Int. Cl.
*H04N 21/218* (2011.01)
*H04N 13/161* (2018.01)
(Continued)

(52) U.S. Cl.
CPC ..... *H04N 21/21805* (2013.01); *H04N 13/161* (2018.05); *H04N 21/2343* (2013.01); *H04N 21/816* (2013.01)

(58) Field of Classification Search
CPC ........... H04N 21/21805; H04N 13/161; H04N 21/2343; H04N 21/816; H04N 21/85406; H04N 23/90
(Continued)

(56) References Cited

U.S. PATENT DOCUMENTS

2020/0053392 A1* 2/2020 Hannuksela ........... H04N 19/46
2020/0296397 A1 9/2020 Wang et al.
(Continued)

FOREIGN PATENT DOCUMENTS

CN 101529914 A 9/2009

OTHER PUBLICATIONS

International Search Report and Written Opinion received for PCT Patent Application No. PCT/CN2022/109521 and English translation, mailed on Oct. 21, 2022, 12 pages.
(Continued)

*Primary Examiner* — Thai Q Tran
*Assistant Examiner* — Stephen R Smith
(74) *Attorney, Agent, or Firm* — ARENTFOX SCHIFF LLP

(57) ABSTRACT

A file decapsulation method for a free viewpoint video includes receiving a media file of free viewpoint video data. The media file includes a video track, the free viewpoint video data includes video data of N viewpoints, and the video track includes codec independence indication information and video bitstreams of M viewpoints. The codec independence indication information indicates whether video data of one of the M viewpoints in the video track depends on video data of other viewpoints during codec. The method further includes decapsulating the media file according to the codec independence indication information, to obtain a video bitstream corresponding to at least one of the M viewpoints, and decoding the video bitstream corresponding to the at least one of the M viewpoints, to obtain reconstructed video data of the at least one of the M viewpoints.

20 Claims, 8 Drawing Sheets

(51) Int. Cl.
*H04N 21/2343* (2011.01)
*H04N 21/81* (2011.01)

(58) Field of Classification Search
USPC .......................................................... 348/43
See application file for complete search history.

(56) References Cited

U.S. PATENT DOCUMENTS

| | | | | |
|---|---|---|---|---|
| 2020/0302650 A1* | 9/2020 | Aksu | ................ | G06T 9/001 |
| 2020/0336726 A1* | 10/2020 | Wang | ................ | H04N 19/44 |
| 2020/0381022 A1* | 12/2020 | Ilola | ................ | G11B 27/102 |
| 2021/0233282 A1* | 7/2021 | Kim | ................ | G06T 15/205 |
| 2021/0250613 A1* | 8/2021 | Wang | ................ | H04N 19/188 |
| 2022/0078515 A1* | 3/2022 | Yu | ................ | H04N 21/2362 |
| 2022/0335978 A1* | 10/2022 | Kondrad | ................ | H04N 21/84 |
| 2023/0059516 A1* | 2/2023 | Schwarz | ................ | H04N 19/179 |

OTHER PUBLICATIONS

Extended European Search Report and Search Opinion received for European Application No. 22855276.6, mailed on Sep. 12, 2024, 9 pages.

Wang Y-K., "Information technology—Coding of audiovisual objects—Part 15: Carriage of network abstraction layer (NAL) unit structured video in the ISO base media file format", [8.1] [VVC FF] Level signalling for sets of subpicture tracks in a subpicture entity group, 134. MPEG Meeting, Online, Motion Picture Expert Group or ISO/IEC JTC1/SC29/ WG11, No. m56676-v1, XP030295207, Apr. 19, 2021, 283 pages.

* cited by examiner

FILE DECAPSULATION METHOD AND APPARATUS FOR FREE VIEWPOINT VIDEO, DEVICE, AND STORAGE MEDIUM

RELATED APPLICATIONS

This application is a continuation of International Application No. PCT/CN2022/109521, filed on Aug. 1, 2022, which claims priority to Chinese Patent Application No. 202110913912.8, filed on Aug. 10, 2021. The disclosures of the prior applications are hereby incorporated by reference in their entirety.

FIELD OF THE TECHNOLOGY

Embodiments of this application relate to the field of video processing technologies, including a file decapsulation method and apparatus for a free viewpoint video, a device, and a storage medium.

BACKGROUND OF THE DISCLOSURE

Immersive media refers to media content that may bring immersive experience to a consumer. The immersive media may be divided into degree of freedom (3DoF) media, 3DoF+media, and 6DoF media according to a degree of freedom of a user when consuming the media content.

However, in a current encapsulation manner of a video bitstream, a server or a client cannot determine whether a media file of a free viewpoint video encapsulated in a single-track encapsulation mode may decode media files corresponding to some viewpoints, to cause decoding efficiency of the media files to be low.

SUMMARY

This disclosure provides a file decapsulation method and apparatus for a free viewpoint video, a device, and a storage medium. A server or a client may determine whether media files corresponding to some viewpoints in the media file may be decoded, thereby improving decoding efficiency of the media file.

In an embodiment, a file decapsulation method for a free viewpoint video includes receiving a media file of free viewpoint video data sent by a first device, the media file including a video track. The free viewpoint video data includes video data of N viewpoints, N being a positive integer. The video track includes codec independence indication information and video bitstreams of M viewpoints, the codec independence indication information indicating whether video data of one of the M viewpoints in the video track depends on video data of other viewpoints during codec, where M is a positive integer less than or equal to N. The method further includes decapsulating the media file according to the codec independence indication information, to obtain a video bitstream corresponding to at least one of the M viewpoints, and decoding the video bitstream corresponding to the at least one of the M viewpoints, to obtain reconstructed video data of the at least one of the M viewpoints.

In an embodiment, a file encapsulation method for a free viewpoint video includes obtaining a bitstream of free viewpoint video data, the free viewpoint video data including video data of N viewpoints, and N being a positive integer. The method further includes encapsulating the bitstream of the free viewpoint video data into a video track, to obtain a media file of the free viewpoint video data. The video track includes codec independence indication information and video bitstreams of M viewpoints, the codec independence indication information indicates whether video data of one of the M viewpoints in the video track depends on video data of other viewpoints during codec, and M is a positive integer less than or equal to N. The method further includes transmitting the media file of the free viewpoint video data to a client or a server.

In an embodiment, a file decapsulation apparatus for a free viewpoint video includes processing circuitry configured to receive a media file of free viewpoint video data sent by a first device, the media file including a video track. The free viewpoint video data includes video data of N viewpoints, N is a positive integer, and the video track includes codec independence indication information and video bitstreams of M viewpoints. The codec independence indication information indicates whether video data of one of the M viewpoints in the video track depends on video data of other viewpoints during codec, and M is a positive integer less than or equal to N. The processing circuitry is further configured to decapsulate the media file according to the codec independence indication information, to obtain a video bitstream corresponding to at least one of the M viewpoints, and decode the video bitstream corresponding to the at least one of the M viewpoints, to obtain reconstructed video data of the at least one of the M viewpoints.

In an embodiment, a non-transitory computer-readable storage medium stores computer-readable instructions which, when executed by a computer device, cause the computer device to perform a file decapsulation method for a free viewpoint video includes receiving a media file of free viewpoint video data sent by a first device, the media file including a video track. The free viewpoint video data includes video data of N viewpoints, N being a positive integer. The video track includes codec independence indication information and video bitstreams of M viewpoints, the codec independence indication information indicating whether video data of one of the M viewpoints in the video track depends on video data of other viewpoints during codec, where M is a positive integer less than or equal to N. The method further includes decapsulating the media file according to the codec independence indication information, to obtain a video bitstream corresponding to at least one of the M viewpoints, and decoding the video bitstream corresponding to the at least one of the M viewpoints, to obtain reconstructed video data of the at least one of the M viewpoints.

In an embodiment, a non-transitory computer-readable storage medium stores computer-readable instructions which, when executed by a computer device, cause the computer device to perform a file encapsulation method for a free viewpoint video includes obtaining a bitstream of free viewpoint video data, the free viewpoint video data including video data of N viewpoints, and N being a positive integer. The method further includes encapsulating the bitstream of the free viewpoint video data into a video track, to obtain a media file of the free viewpoint video data. The video track includes codec independence indication information and video bitstreams of M viewpoints, the codec independence indication information indicates whether video data of one of the M viewpoints in the video track depends on video data of other viewpoints during codec, and M is a positive integer less than or equal to N. The method further includes transmitting the media file of the free viewpoint video data to a client or a server.

In summary, in this disclosure, the codec independence indication information is added in the video track. The codec independence indication information is used for indicating whether the video data of a single viewpoint in the M viewpoints corresponding to the video track depends on the video data of other viewpoint during codec. In this way, in the single-track encapsulation mode, the client may determine whether a texture map and a depth map of a specific camera may be partially decoded according to the codec independence indication information. In addition, in the single-track encapsulation mode, the server may also determine whether a single-track encapsulated free viewpoint video may be re-encapsulated according to a multi-track according to the codec independence indication information, thereby improving processing flexibility of the media file and improving decoding efficiency.

BRIEF DESCRIPTION OF THE DRAWINGS

To describe the technical solutions in the embodiments of the present disclosure more clearly, the following briefly describes the accompanying drawings describing the embodiments. The accompanying drawings in the following description show merely some embodiments of the present disclosure, and a person of ordinary skill in the art may still derive other drawings from these accompanying drawings.

DESCRIPTION OF EMBODIMENTS

The following describes the technical solutions in the embodiments of the present disclosure with reference to the accompanying drawings. The described embodiments are some of the embodiments of the present disclosure rather than all of the embodiments. All other embodiments obtained by a person of ordinary skill in the art based on the embodiments of the present disclosure shall fall within the protection scope of the present disclosure.

The terms such as "first" and "second" in this specification, the claims, and the foregoing accompanying drawings of the present disclosure are intended to distinguish between similar objects rather than describe a particular sequence or a chronological order. It is to be understood that data used in this way is exchangeable in a proper case, so that the embodiments of the present disclosure described herein can be implemented in an order different from the order shown or described herein. Moreover, the terms "include", "contain" and any other variants mean to cover the non-exclusive inclusion. For example, a process, method, system, product, or server that includes a list of steps or units is not necessarily limited to those steps or units, but may include other steps or units not expressly listed or inherent to such a process, method, product, or device.

Embodiments of this disclosure relate to a data processing technology for immersive media.

Before introducing the technical solution of this disclosure, the following first introduces related knowledge of this disclosure:

Free viewpoint video: an immersive media video that is captured by a plurality of cameras, includes different viewpoints, and supports 3DoF+ or 6DoF interaction performed by a user. The free viewpoint video is also referred to as a multi-viewpoint video.

Track: a set of media data in a media file encapsulation process. One media file may include a plurality of tracks. For example, one media file may include one video track, one audio track, and one subtitle track.

Sample: an encapsulation unit in the media file encapsulation process. One media track includes a plurality of samples. For example, a sample of the video track is usually a video frame.

DoF: degree of freedom. In a mechanical system, the degree of freedom refers to a number of independent coordinates. In addition to a degree of freedom of translation, there are also degrees of freedom of rotation and vibration. In the embodiments of the application, the degree of freedom refers to a degree of freedom in which movement is supported and content exchange is generated when a user watches immersive media.

Figure 1:
FIG. 1 is a schematic diagram of three degrees of freedom.

3DoF: namely three degrees of freedom, refers to three degrees of freedom in which a head of the user rotates around an X axis, a Y axis, and a Z axis. FIG. 1 is a schematic diagram of three degrees of freedom. As shown in FIG. 1, the three degrees of freedom refers to that rotation may be performed at a specific place and a specific point of all three axes, the head may be turned, the head may be bowed up and down, and the head may also be swung. After experiencing the three degrees of freedom, the user may immerse in a scene 360 degrees. If a panoramic picture is static, the panoramic picture may be understood as a panoramic picture. If the panoramic picture is dynamic, the panoramic picture is a panoramic video, namely, a VR video. However, the VR video has certain limitations. The user cannot move, and cannot select any place to view.

Figure 2:
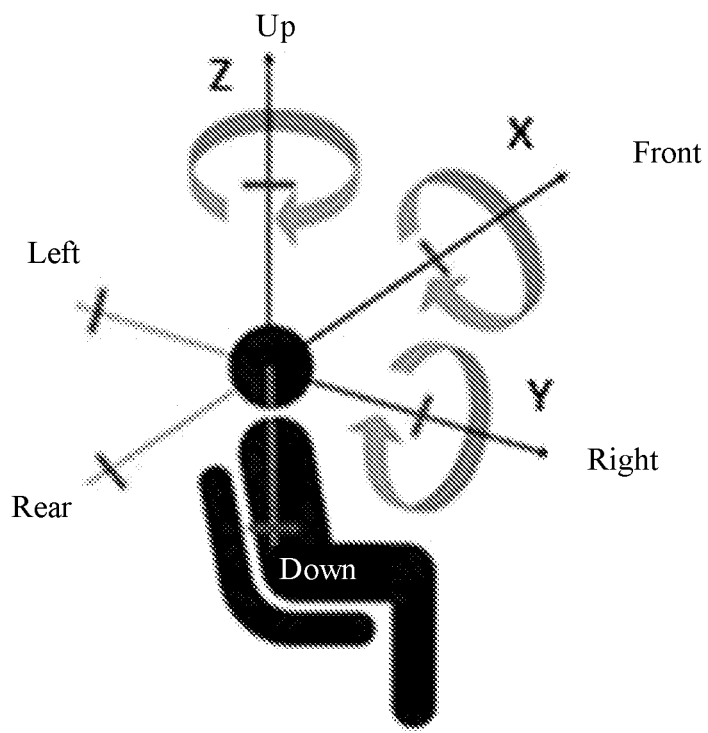
FIG. 2 is a schematic diagram of three degrees of freedom+.

3DoF+: based on the three degrees of freedom, the user further has limited freedom of performing movement along the X axis, the Y axis, and the Z axis, which may also be referred to as restricted six degrees of freedom, and a corresponding media bitstream may be referred to as a restricted six degrees of freedom media bitstream. FIG. 2 is a schematic diagram of three degrees of freedom+.

Figure 3:
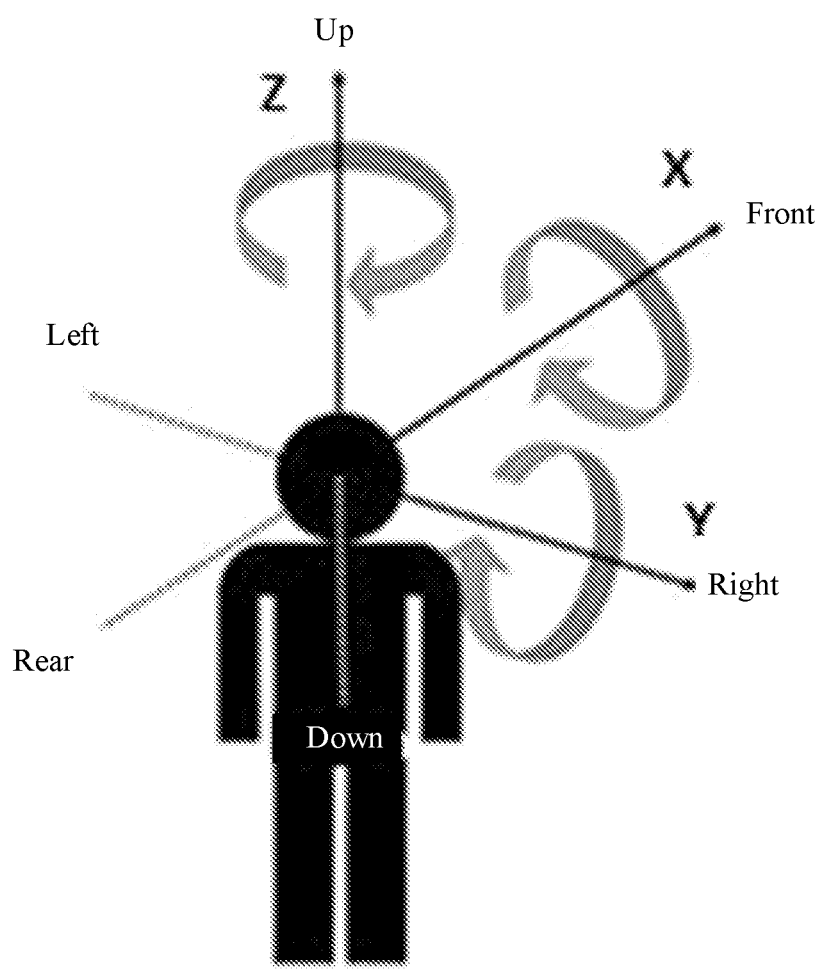
FIG. 3 is a schematic diagram of six degrees of freedom.

6DoF: based on the three degrees of freedom, the user further has the freedom to perform movement freely along the X axis, the Y axis, and the Z axis, and a corresponding media bitstream may be referred to as a six degrees of freedom media bitstream. FIG. 3 is a schematic diagram of six degrees of freedom. 6DoF media refers to a 6 degrees of freedom video, which refers to that the video may provide the user with a high degree of freedom viewing experience of free movement viewpoints in a direction of the X axis, a direction of the Y axis, and a direction of the Z axis of three-dimensional space and free rotation viewpoints surrounding the X axis, the Y axis, and the Z axis. The 6DoF media is a video combination of different viewpoints in space captured by a camera array. To facilitate expression, storage, compression, and processing of the 6DoF media, 6DoF media data is expressed as a combination of the following information: a texture map captured by a multi-camera, a depth map corresponding to a texture map of the multi-camera, and corresponding 6DoF media content description metadata. The metadata includes parameters of the multi-camera, and description information such as a stitching layout and edge protection of the 6DoF media. On an encoding side, texture map information of the multi-camera and corresponding depth map information are stitched, and description data of a stitching manner is written into the metadata according to the defined syntax and semantics. The stitched depth map of the multi-camera and texture map information are encoded by a planar video compression manner, and transmitted to a terminal for decoding, then a 6DoF virtual viewpoint requested by the user is synthesized, thereby providing the user with a viewing experience of the 6DoF media.

Depth map: as a manner to express three-dimensional scene information, a gray value of each pixel in the depth map may be used for representing a distance of a point in the scene from the camera.

AVS: Audio Video Coding Standard

AVS3: a third-generation audio and video codec standard introduced by an AVS working group ISOBMFF: ISO Based Media File Format, a media file format based on an International Standard Organization (ISO) standard. ISOBMFF is an encapsulation standard for the media file. The most typical ISOBMFF file is a Moving Picture Experts Group 4 (MP4) file.

DASH: dynamic adaptive streaming over HTTP, HTTP-based dynamic adaptive streaming is an adaptive bit rate streaming technology that enables high-quality streaming media to be delivered over the Internet through a conventional HTTP network server.

MPD: media presentation description, media presentation description signaling in DASH, used for describing media segment information.

Representation: in DASH, a combination of one or more media components, such as a video file with a specific resolution, may be regarded as a Representation.

Adaptation Set: in DASH, a set of one or more video streams. One Adaptation Set may include a plurality of Representations.

HEVC: High Efficiency Video Coding, an international video coding standard HEVC/H.265.

VVC: versatile video coding, an international video coding standard VVC/H.266.

Intra (picture) Prediction: intra-frame prediction.

Inter (picture) Prediction: inter-frame prediction.

SCC: screen content coding.

Immersive media refers to media content that may bring immersive experience to a consumer. The immersive media may be divided into 3DoF media, 3DoF+media, and 6DoF media according to a degree of freedom of a user when consuming media content. The common 6DoF media includes a multi-viewpoint video and point cloud media.

The free viewpoint video is usually shot by the camera array from a plurality of angles on the same 3D scene to form texture information (color information) and depth information (spatial distance information) of the scene. According to user location information combined with texture information and depth information from different cameras, the 6DoF media consumed by a user side may be formed.

After the free viewpoint video is captured, the video needs to be compressed and encoded. In the existing free viewpoint video technology, a video compression algorithm may be completed by the AVS3 coding technology, the HEVC coding technology, or the like.

Figure 4:
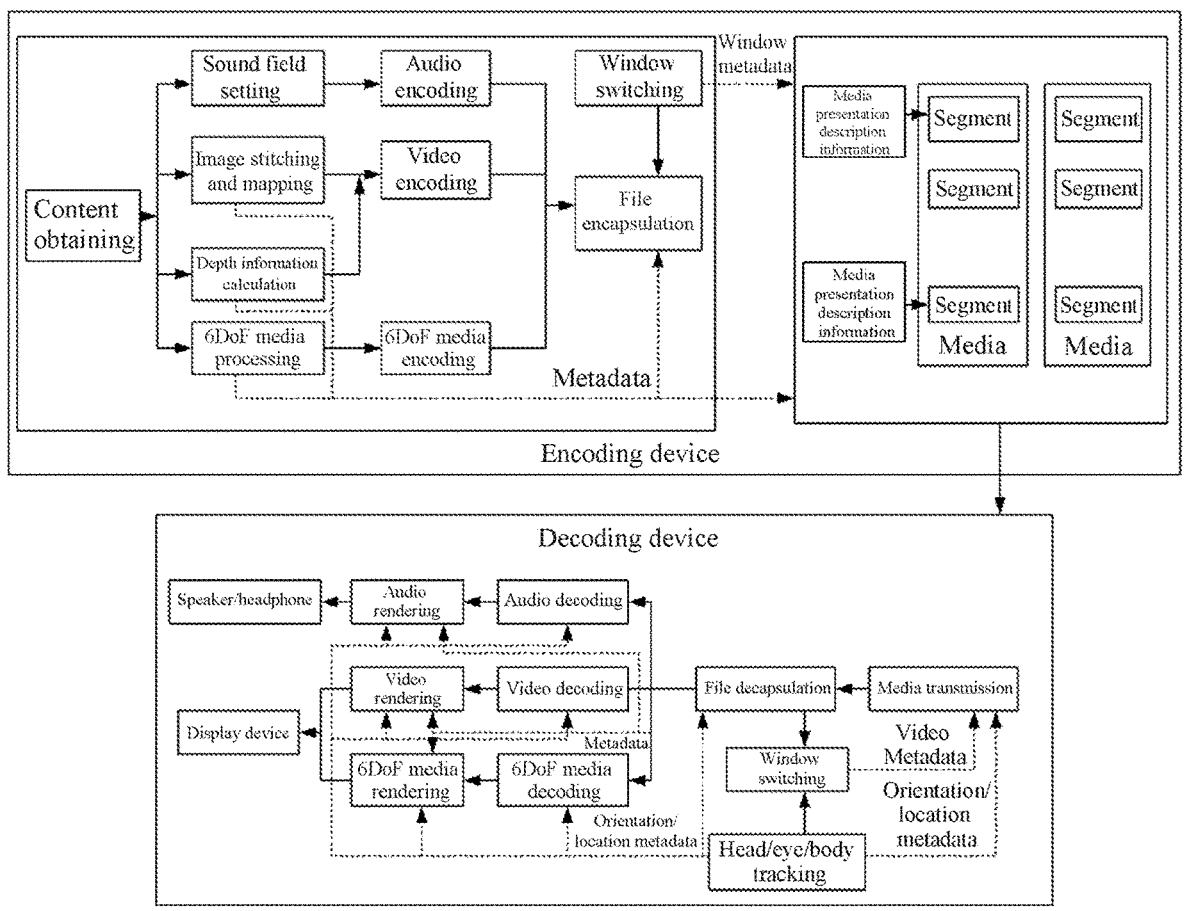
FIG. 4 is a diagram of an architecture of an immersive media system according to an embodiment of this disclosure.

FIG. 4 is a diagram of an architecture of an immersive media system according to an embodiment of this disclosure. As shown in FIG. 4, the immersive media system includes an encoding device and a decoding device. The encoding device may refer to a computer device used by a provider of the immersive media. The computer device may be a terminal (such as a personal computer (PC), an intelligent mobile device (such as a smart phone) or a server. The decoding device may refer to a computer device used by a user of the immersive media. The computer device may be a terminal (such as a personal computer (PC), a smart mobile device (such as a smart phone), or a VR device (such as a VR helmet, VR glasses, or the like). A data processing process of the immersive media includes a data processing process on an encoding device side and a data processing process on a decoding device side.

The data processing process on the encoding device side mainly includes:

(1) an obtaining and production process of media content of the immersive media; and (2) encoding of the immersive media and a process of file encapsulation. The data processing process on the decoding device side mainly includes:

(3) a process of decapsulating and decoding files of the immersive media; and (4) a rendering process of the immersive media.

In addition, a transmission process involving the immersive media between the encoding device and the decoding device may be performed based on various transmission protocols. The transmission protocols may include but are not limited to: a dynamic adaptive streaming over HTTP (DASH) protocol, an HTTP live streaming (HLS) protocol, a smart media transport protocol (SMTP), a transmission control protocol (TCP), and the like.

Each process involved in the data processing process of the immersive media will be described in detail below with reference to FIG. 4.

1. The Data Processing Process on the Encoding Device Side:

(1) an obtaining and production process of media content of the immersive media.

(1) An obtaining process of media content of the immersive media.

The media content of the immersive media is obtained by capturing a real-world audio-visual scene through a capturing device.

In an implementation, the capturing device may refer to a hardware component arranged in the encoding device. For example, the capturing device refers to a microphone, a camera, and a sensor of a terminal. In another implementation, the capturing device may also be a hardware apparatus connected to the encoding device, for example, a camera connected to the server.

The capturing device may include but not limited to: an audio device, a camera device, and a sensing device. The audio device may include an audio sensor, a microphone, and the like. The camera device may include a common camera, a stereo camera, a light field camera, and the like. The sensing device may include a laser device, a radar device, and the like.

A number of capturing devices may be more than one. These capturing devices are deployed at some specific locations in real space to simultaneously capture audio content and video content from different angles in the space, and the captured audio content and video content are synchronized in time and space. The media content captured by the capturing device is referred to as raw data of the immersive media.

(2) A production process of media content of the immersive media.

The captured audio content is content that is suitable for performing audio encoding for the immersive media. The captured video content may only become content suitable for video encoding of the immersive media after a series of production processes are performed. The production process includes:

① stitching. Because the captured video content is obtained by being shot by the capturing device at different angles, stitching refers to stitching the video content shot from these various angles into a complete video that may reflect a 360-degree visual panorama of the real space. To be specific, the stitched video is a panoramic video (or a spherical video) represented in three-dimensional space.

② Projection. Projection refers to a process of mapping a three-dimensional video formed by stitching onto a two-dimensional (2-Dimension, 2D) image, and the 2D image formed by projection is referred to as a projection image; and manners of projection may include but are not limited to: latitude and longitude map projection and regular hexahedron projection.

③ Regional encapsulation. A projected image may be directly encoded, or the projected image may be encoded after region encapsulation is performed. In practice, it is found that in a process of data processing of the immersive media, after region encapsulation is performed on the two-dimensional projected image, then encoding is performed, which may greatly improve video encoding efficiency of the immersive media. Therefore, the region encapsulation technology is widely used in a process of video processing of the immersive media. The so-called region encapsulation refers to a process of performing conversion processing on the projected image according to a region, and in a process of the region encapsulation, the projected image is converted into the encapsulation image. The process of the region encapsulation specifically includes: dividing the projected image into a plurality of mapping regions, then performing conversion processing on the plurality of mapping regions to obtain a plurality of encapsulation regions, and mapping the plurality of encapsulation regions to a 2D image to obtain an encapsulation image. The mapping region refers to a region obtained by dividing in the projected image before performing region encapsulation; and the encapsulation region is a region that is located in the encapsulation image after performing region encapsulation.

Conversion processing may include, but is not limited to: processing such as mirroring, rotation, rearrangement, upsampling, downsampling, changing a resolution of a region, and moving.

Because the capturing device may only capture the panoramic video, after such video is processed by the encoding device and transmitted to the decoding device for corresponding data processing, the user on the decoding device side may only view 360-degree video information by performing some specific actions (such as head rotation). However, corresponding video changes cannot be obtained by performing a non-specific action (such as moving the head), and the VR experience is not good. Therefore, additional depth information that matches the panoramic video is provided, so that the user may obtain better immersion and a better VR experience. This involves the six degrees of freedom (6DoF) production technology. When the user may move freely in a simulated scene, which is referred to as 6DoF. When using the 6DoF production technology to produce the video content of the immersive media, for the capturing device, a light field camera, a laser device, a radar device, or the like is generally used. Point cloud data or light field data in the space is captured, and in a process of performing the foregoing production processes ① to ③, some specific processing further needs to be performed, such as cutting and mapping of the point cloud data, calculation of the depth information, or the like.

(2) encoding of the immersive media and a process of file encapsulation.

Audio encoding may be directly performed on the captured audio content to form an audio bitstream of the immersive media. After the foregoing production processes ① and ② or ① to ③ are performed, video encoding is performed on the projected image or encapsulation image, to obtain the video bitstream of the immersive media. If the 6DoF production technology is used, a specific encoding manner (such as point cloud encoding) needs to be used to perform encoding in the video encoding process. The audio bitstream and the video bitstream are encapsulated in a file container according to a file format of the immersive media (such as an ISO base media file format (ISOBMFF)) to form a media file resource of the immersive media. The media file resource may be a media file or a media file in which a media fragment forms the immersive media; and according to a file format requirement of the immersive media, media presentation description (MPD) is used to record metadata of the media file resource of the immersive media. The metadata is a general term for information related to presentation of the immersive media. The metadata may include description information of the media content, description information of a window, signaling information related to presentation of the media content, and the like. As shown in FIG. 1, the encoding device stores the media presentation description information and the media file resource formed after the data processing process is performed.

An immersive media system supports a data box. The data box refers to a data block or object including the metadata. To be specific, the data box includes metadata of the corresponding media content. The immersive media may include a plurality of data boxes, for example, a sphere region zooming box, which includes metadata used for describing sphere region zooming information; a 2D region zooming data box includes metadata used for describing 2D region zooming information; and a region wise packing box includes metadata used for describing corresponding information in a region encapsulation process.

2. The Data Processing Process on the Decoding Device Side:

(3) a process of decapsulating and decoding files of the immersive media; and the decoding device may adaptively and dynamically obtain the media file resource of the immersive media and the corresponding media presentation description information from the encoding device through recommendation of the encoding device or according to a user requirement on the decoding device side. For example, the decoding device may determine an orientation and a location of the user based on tracking information of the head/eyes/body of the user, and then dynamically request the encoding device to obtain the corresponding media file resource based on the determined orientation and location. The media file resource and the media presentation description information are transmitted from the encoding device to the decoding device through a transmission mechanism (such as DASH, SMT). A process of decapsulating the file on the decoding device side is opposite to a process of encapsulating the file on the encoding device side. The decoding device decapsulates the media file resource according to a file format requirement of the immersive media, to obtain the audio bitstream and the video bitstream. A decoding process on the decoding device side is opposite to an encoding process on the encoding device side. The decoding device performs audio decoding on the audio bitstream to restore the audio content.

In addition, the decoding process performed on the video bitstream by the decoding device includes the following:

① decoding the video bitstream to obtain a planar image. According to the metadata provided by the media presentation description information, if the metadata indicates that the immersive media performs the region encapsulation process, the planar image refers to the encapsulation image; and if the metadata indicates that the immersive media does not perform the region encapsulation process, then the planar image refers to the projected image.

② If the metadata indicates that the immersive media performs the region encapsulation process, the decoding device performs region encapsulation on the encapsulation image to obtain the projected image. The region decapsulation is opposite to the region encapsulation. The region decapsulation refers to a process of performing inverse conversion processing on the encapsulation image according to the region. The region decapsulation converts the encapsulation image into the projected image. A process of region decapsulation specifically includes: performing inverse conversion processing on a plurality of encapsulation regions in the encapsulation image according to the metadata to obtain a plurality of mapping regions, and mapping the plurality of mapping regions to a 2D image to obtain the projected image. The inverse conversion processing refers to processing opposite to the conversion processing. For example, if the conversion processing refers to 90-degree counterclockwise rotation, then the inverse conversion processing refers to 90-degree clockwise rotation.

③ Reconstruction processing is performed on the projected image according to the media presentation description information to convert the projected image into a 3D image. The reconstruction process refers to processing of reprojecting the two-dimensional projected image into 3D space.

(4) a rendering process of the immersive media.

The decoding device performs rendering on the audio content obtained by performing audio decoding and the 3D image obtained by performing video decoding according to the metadata related to rendering and a window in the media presentation description information. After the rendering is completed, playback and output of the 3D image is implemented. In particular, if the 3DoF production technology and the 3DoF+ production technology are used, the decoding device mainly performs rendering on the 3D image based on a current viewpoint, disparity, depth information, and the like. If the 6DoF production technology is used, the decoding device mainly performs rendering on the 3D image in the window based on the current viewpoint. The viewpoint refers to a viewing location point of the user, the disparity refers to a visual difference caused by binoculars of the user or a visual difference caused by performing movement, and the window refers to a viewing region.

An immersive media system supports a data box. The data box refers to a data block or object including the metadata. To be specific, the data box includes metadata of the corresponding media content. The immersive media may include a plurality of data boxes, for example, a sphere region zooming box, which includes metadata used for describing sphere region zooming information; a 2D region zooming data box includes metadata used for describing 2D region zooming information; and a region wise packing box includes metadata used for describing corresponding information in a region encapsulation process.

In some embodiments, for encapsulation of a free viewpoint video, the following file encapsulation mode is proposed:

1. Free Viewpoint Track Group

If a free viewpoint video is encapsulated into a plurality of video tracks, these video tracks need to be associated through the free viewpoint track group, and the free viewpoint track group is defined as follows:

```
aligned(8) class AvsFreeViewGroupBox extends
TrackGroupTypeBox('afvg') {
    // track_group_id is inherited from TrackGroupTypeBox;
    unsigned int(8) camera_count;
    for(i=0; i<camera_count; i++){
        unsigned int(32) camera_id;
        unsigned int(2) depth_texture_type;
        bit(6) reserved;
    }
}
```

The free viewpoint track group is obtained by extending a track group data box, and is identified by an 'a3fg' track group type. in all tracks including TrackGroupTypeBox of an 'afvg' type, tracks with the same group ID belong to the same track group. Semantics of each field in AvsFreeViewGroupBox are as follows:

camera_count: indicates a number of cameras from which free viewpoint texture information or depth information included in the track is derived.

camera_id: indicates a camera identifier corresponding to each camera, and the camera identifier corresponds to a value in AvsFreeViewInfoBox in a current track.

depth_texture_type: indicates a type of texture information or depth information captured by a corresponding camera included in the track, and values are shown in Table 1 below.

TABLE 1

| A value of depth_texture_type | Meaning |
| --- | --- |
| 0 | Reserved |
| 1 | Indicate that texture information captured by a corresponding camera is included |
| 2 | Indicate that depth information captured by a corresponding camera is included |
| 3 | Indicate that texture information and depth information captured by a corresponding camera is included |

2. Free Viewpoint Information Data Box

```
aligned(8) class AvsFreeViewInfoBox extends FullBox('afvi'){
    unsigned int(8) stitching_layout;
    unsigned int(8) texture_padding_size;
    unsigned int(8) depth_padding_size;
    unsigned int(8) camera_model;
    unsigned int(8) camera_count;
    for(i=0; i<camera_count; i++){
        unsigned int(32) camera_id;
        signed int(32) camera_pos_x;
        signed int(32) camera_pos_y;
        signed int(32) camera_pos_z;
        signed int(32) camera_focal_length_x;
        signed int(32) camera_focal_length_y;
        unsigned int(32) camera_resolution_x;
        unsigned int(32) camera_resolution_y;
        unsigned int(8) depth_downsample_factor;
        unsigned int(32) texture_vetex_x;
        unsigned int(32) texture_vetex_y;
        unsigned int(32) depth_vetex_x;
        unsigned int(32) depth_vetex_y;
        ExtendedParaStruct( );
    }
}
aligned(8) class ExtendedParaStruct( ) {
    unsigned int(8) para_num;
    for(i=0; i<para_num; i++){
        unsigned int(8) para_type;
        unsigned int(16) para_length;
        for (i=0; i < para_length; i++) {
            bit(8) camera_parameter;
        }
    }
}
``` stitching_layout: indicates whether a texture map and a depth map in the track are stitched and encoded, and values are shown in Table 2:

TABLE 2

| A value of stitching_layout | 6DoF video stitching layout |
| --- | --- |
| 0 | Depth map and texture map are stitched and encoded |
| 1 | Depth map and texture map are respectively encoded |
| Another | Reserved | depth_padding_size: a guard band width of the depth map.

texture_padding_size: a guard band width of the texture map.

camera_model: indicates a model type of a camera, and values are shown in Table 3:

TABLE 3

| Camera model | 6DoF video camera model |
| --- | --- |
| 0 | Pinhole model |
| 1 | Fisheye model |
| Another | Reserved | camera_count: a number of all cameras that capture videos.

camera_id: a camera identifier corresponding to each viewpoint.

camera_pos_x, camera_pos_y, camera_pos_z: respectively indicate component values of x, y, and z of a camera location.

focal_length_x, focal_length_y: respectively indicate components values of x and y of a focal length of the camera.

camera_resolution_x, camera_resolution_y: a resolution width and height of the texture map and the depth map captured by the camera.

depth_downsample_factor: a multiplication factor for downsampling of the depth map. An actual resolution width and height of the depth map is $\frac{1}{2}^{depth\_downsample\_factor}$ of the resolution width and height captured by the camera.

depth_vetex_x, depth_vetex_y: component values of x and y that are offset of an upper left vertex of the depth map relative to an origin of a planar frame (the upper left vertex of the planar frame).

texture_vetex_x, texture_vetex_y: component values of x and y that are offset of an upper left vertex of the texture map relative to an origin of a planar frame (the upper left vertex of the planar frame).

para_num: a number of user-defined camera parameters.

para_type: a type of user-defined camera parameters.

para_length: a length of user-defined camera parameters, in a unit of bytes.

camera_parameter: a user-defined parameter.

It may be learnt from the above that although the foregoing embodiment indicates parameter information related to the free viewpoint video, the foregoing embodiment also supports free viewpoint multi-track encapsulation. However, the solution does not indicate codec independence of the texture map and the depth map corresponding to different cameras, so that in the single-track encapsulation mode, the client cannot determine whether the texture map and the depth map of a specific camera may be partially decoded. Similarly, in the absence of the codec independence indication information, the server cannot determine whether the single-track encapsulated free viewpoint video may be re-encapsulated according to a multi-track.

To resolve the above technical problems, in this disclosure, the codec independence indication information is added in the video track. The codec independence indication information is used for indicating whether the video data of a single viewpoint in the M viewpoints corresponding to the video track depends on the video data of other views during codec. In this way, in the single-track encapsulation mode, the client may determine whether a texture map and a depth map of a specific camera may be partially decoded according to the codec independence indication information. In addition, in the single-track encapsulation mode, the server may also determine whether a single-track encapsulated free viewpoint video may be re-encapsulated according to a multi-track according to the codec independence indication information, thereby improving processing flexibility of the media file and improving decoding efficiency of the media file.

The technical solution of the embodiments of this disclosure is described in detail below through some embodiments. The following embodiments may be mutually combined, and same or similar concepts or processes may not be repeatedly described in some embodiments.

Figure 5:
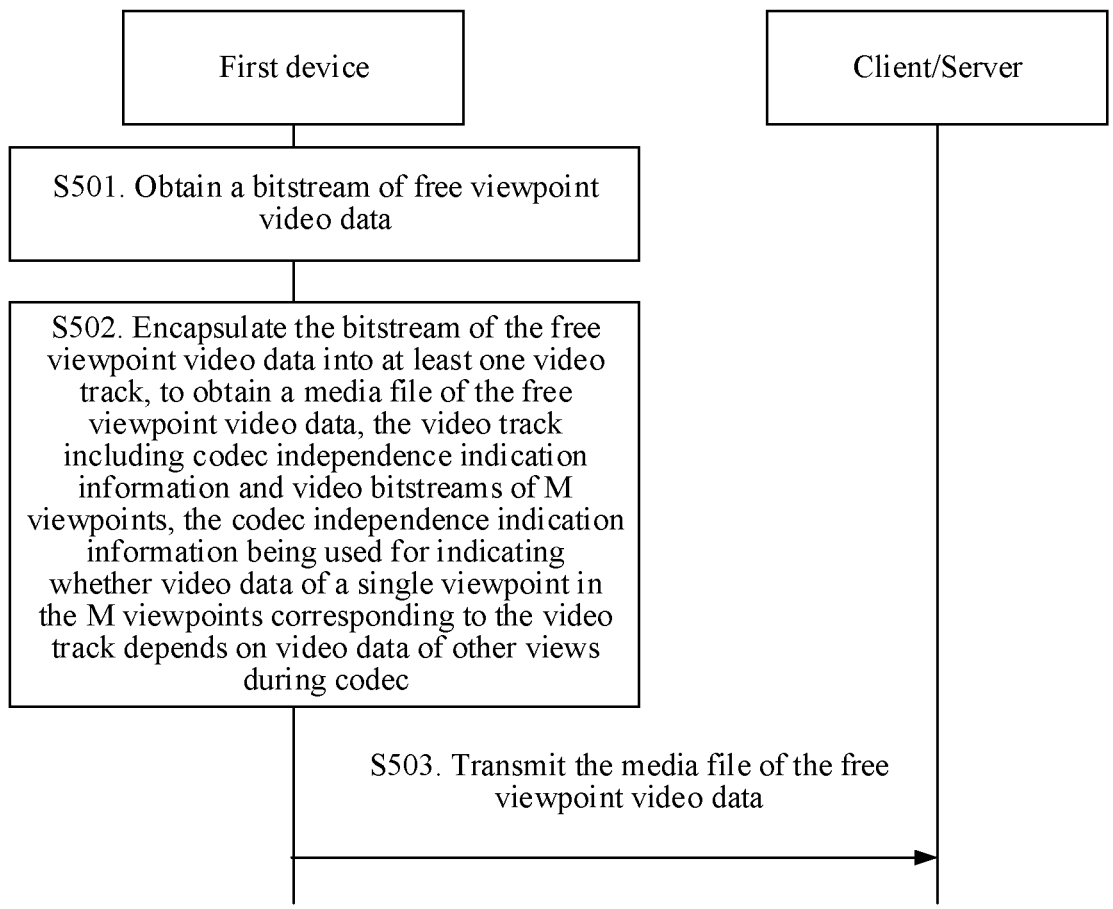
FIG. 5 is a flowchart of a file encapsulation method for a free viewpoint video according to an embodiment of this disclosure.

FIG. 5 is a flowchart of a file encapsulation method for a free viewpoint video according to an embodiment of this disclosure. As shown in FIG. 5, the method includes the following steps:

S501. A first device obtains a bitstream of free viewpoint video data.

The free viewpoint video data includes video data of N viewpoints, and N is a positive integer.

The free viewpoint video data in the embodiments of this disclosure is video data of N viewpoints captured by N cameras. For example, N is 6, and these 6 cameras with different viewpoints capture video data, to obtain video data of 6 views. The video data of these 6 views constitutes the free viewpoint video data in the embodiments of this disclosure.

In some embodiments, the viewpoints of the free viewpoint video are also referred to as multi-viewpoint video data.

In the embodiments of this disclosure, the first device may be understood as a video encapsulation device, or an encoding device. A manner of the first device to obtain a bitstream of the free viewpoint video data includes but is not limited to the following:

Manner 1. The first device obtains the bitstream of the free viewpoint video data from other devices.

For example, the first device obtains the bitstream of the free viewpoint video data from a memory device, and obtains the bitstream of the free viewpoint video data from another encoding device.

Manner 2. The first device encodes the free viewpoint video data, to obtain the bitstream of the free viewpoint video data. For example, the first device is the encoding device. After obtaining the free viewpoint video data from a capturing device (such as a camera), the first device encodes the free viewpoint video data, to obtain the bitstream of the free viewpoint video data.

The embodiments of this disclosure do not limit specific content of the video data. For example, the video data includes at least one of captured texture map data and depth map data.

S502. The first device encapsulates the bitstream of the free viewpoint video data into at least one video track, to obtain a media file of the free viewpoint video data, the video track including codec independence indication information and video bitstreams of M viewpoints, the codec independence indication information being used for indicating whether video data of a single viewpoint in M viewpoints corresponding to the video track depends on video data of other viewpoints during codec, and M being a positive integer less than or equal to N. For example, the bitstream of the free viewpoint video data is encapsulated into a video track, to obtain a media file of the free viewpoint video data. The video track includes codec independence indication information and video bitstreams of M viewpoints. The codec independence indication information indicates whether video data of one of the M viewpoints in the video track depends on video data of other viewpoints during codec, where M is a positive integer less than or equal to N.

Specifically, the first device encapsulates the bitstream of the free viewpoint video data into at least one video track, and the at least one video track forms a media file of the free viewpoint video data.

In a possible implementation, the single-track encapsulation mode is used to encapsulate the bitstream of the free viewpoint video data into at least one video track.

In a possible implementation, the multi-track encapsulation manner is used to encapsulate the bitstream of the free viewpoint video data into a plurality of video tracks. For example, a video bitstream corresponding to each viewpoint in the N viewpoints is encapsulated into a video track, and then N video tracks are obtained. Alternatively, a video bitstream corresponding to one or more viewpoints in the N viewpoints is encapsulated into a video track, to obtain a plurality of video tracks. Each video track may include at least one video bitstream corresponding to one viewpoint.

To facilitate processing of the media file by the client or server, this disclosure adds the codec independence indication information to the video track, so that the client or server processes the media file according to the codec independence indication information.

In some embodiments, the codec independence indication information is added in each formed video track. The codec independence indication information is used for indicating whether the video data of a single viewpoint in a plurality of viewpoints corresponding to the video track depends on the video data of other views during codec.

In some embodiments, during video encoding, encoding manners of N viewpoints are consistent. Therefore, codec independence indication information may be added to one or more video tracks. The codec independence indication information is used for indicating whether the video data of a single viewpoint in the N viewpoints depends on the video data of other viewpoints during codec.

In some embodiments, in a case that a value of the codec independence indication information is a first value, it indicates that texture map data of the single viewpoint depends on texture map data and depth map data of other viewpoints during codec, or depth map data of the single viewpoint depends on texture map data and depth map data of other views during codec; or in a case that a value of the codec independence indication information is a second value, it indicates that texture map data of the single viewpoint depends on texture map data of other views during codec, and depth map data of the single viewpoint depends on depth map data of other viewpoints during codec; or in a case that a value of the codec independence indication information is a third value, it indicates that texture map data and depth map data of the single viewpoint do not depend on texture map data and depth map data of other viewpoints during codec, and the texture map data and the depth map data of the single viewpoint depend on each other during codec; or in a case that a value of the codec independence indication information is a fourth value, it indicates that texture map data and depth map data of the single viewpoint do not depend on texture map data and depth map data of other viewpoints during codec, and the texture map data and the depth map data of the single viewpoint do not depend on each other during codec.

A corresponding relationship between a value of the codec independence indication information and the codec independence indicated by the codec independence indication information is shown in Table 4:

TABLE 4

| A value of codec independence indication information | Codec independence |
|---|---|
| A first value | Texture map data of the single viewpoint depends on texture map data and depth map data of other viewpoints during codec, or depth map data of the single viewpoint depends on texture map data and depth map data of other viewpoints during codec. |
| Second value | The texture map data of the single viewpoint depends on the texture map data of other viewpoints during codec, and the depth map data of the single viewpoint depends on the depth map data of other viewpoints during codec. |
| Third value | The texture map data or the depth map data of the single viewpoint does not depend on the texture map data and the depth map data of other viewpoints during codec, and the texture map data and the depth map data of the single viewpoint depend on each other during codec. |
| Fourth value | The texture map data and the depth map data of the single viewpoint do not depend on the texture map data and the depth map data of other views during codec, and the texture map data and the depth map data of the single viewpoint do not depend on each other during codec. |
| Another | Reserved |

The embodiments of this disclosure do not limit specific values of the first value, the second value, the third value, and the fourth value, which are specifically determined according to actual needs.

In an embodiment, the first value is 0.
In an embodiment, the second value is 1.
In an embodiment, the third value is 2.
In an embodiment, the fourth value is 3.

In some embodiments, the codec independence indication information may be added to a free viewpoint information data box of the video track.

If an encapsulation standard of the media file is ISOBMFF, the codec independence indication information is represented by a field codec_independency.

The free viewpoint information data box of the embodiments of this disclosure includes the following content:

```
aligned(8) class AvsFreeViewInfoBox extends FullBox('afvi'){
   unsigned int(8) codec_independency;
   unsigned int(8) texture_padding_size;
   unsigned int(8) depth_padding_size;
   unsigned int(8) camera_model;
   unsigned int(8) camera_count;
   for(i=0; i<camera_count; i++){
      unsigned int(8) camera_id;
      signed int(32) camera_pos_x;
      signed int(32) camera_pos_y;
      signed int(32) camera_pos_z;
      signed int(32) camera_focal_length_x;
      signed int(32) camera_focal_length_y;
      unsigned int(32) camera_resolution_x;
      unsigned int(32) camera_resolution_y;
      unsigned int(8) depth_downsample_factor;
      unsigned int(32) texture_vetex_x;
      unsigned int(32) texture_vetex_y;
      unsigned int(32) depth_vetex_x;
      unsigned int(32) depth_vetex_y;
   }
}
```

In the embodiments of this disclosure, an unsigned int(8) stitching_layout field in a free viewpoint information data box is deleted. stitching_layout: indicates whether a texture map and a depth map in the track are stitched and encoded, and details are shown in Table 5:

TABLE 5

| A value of stitching_layout | 6DoF video stitching layout |
|---|---|
| 0 | Depth map and texture map are stitched and encoded |
| 1 | Depth map and texture map are respectively encoded |
| Another | Reserved |

Correspondingly, in the embodiments of this disclosure, the codec_independency field is added. The codec_independency: indicates codec independence between the texture map and the depth map corresponding to each camera in a track, and details are shown in Table 6:

TABLE 6

| A value of codec_independency | Codec independence |
|---|---|
| 0 | Texture map data of the single viewpoint depends on texture map data and depth map data of other viewpoints during codec, or depth map data of the single viewpoint depends on texture map data and depth map data of other viewpoints during codec. |
| 1 | The texture map data of the single viewpoint depends on the texture map data of other viewpoints during codec, and the depth map data of the single viewpoint depends on the depth map data of other viewpoints during codec. |
| 2 | The texture map data and the depth map data of the single viewpoint do not depend on the texture map data and the depth map data of other views during codec, and the texture map data and the depth map data of the single viewpoint do not depend on each other during codec. |
| 3 | The texture map data and the depth map data of the single viewpoint do not depend on the texture map data and the depth map data of other views during codec, and the texture map data and the depth map data of the single viewpoint do not depend on each other during codec. |
| Another | Reserved | depth_padding_size: a guard band width of the depth map.

texture_padding_size: a guard band width of the texture map.

camera_model: indicates a model type of a camera, as shown in Table 7:

TABLE 7

| Camera model | 6DoF video camera model |
|---|---|
| 0 | Pinhole model |
| 1 | Fisheye model |
| Another | Reserved | camera_count: a number of all cameras that capture videos.

camera_id: a camera identifier corresponding to each viewpoint.

camera_pos_x, camera_pos_y, camera_pos_z: respectively indicate component values of x, y, and z of a camera location.

focal_length_x, focal_length_y: respectively indicate components values of x and y of a focal length of the camera.

camera_resolution_x, camera_resolution_y: a resolution width and height of the texture map and the depth map captured by the camera.

depth_downsample_factor: a multiplication factor for downsampling of the depth map. An actual resolution width and height of the depth map is $\frac{1}{2}^{depth\_downsample\_factor}$ of the resolution width and height captured by the camera.

depth_vetex_x, depth_vetex_y: component values of x and y that are offset of an upper left vertex of the depth map relative to an origin of a planar frame (the upper left vertex of the planar frame).

texture_vetex_x, texture_vetex_y: component values of x and y that are offset of an upper left vertex of the texture map relative to an origin of a planar frame (the upper left vertex of the planar frame).

In some embodiments, if the bitstream of the video data of the target viewpoint is obtained by the first device from another device, then the bitstream of the video data of the target viewpoint includes the codec independence indication information. The codec independence indication information is used for indicating whether the video data of a single viewpoint in the N viewpoints depends on the video data of other views during codec. In this way, the first device may obtain, according to the codec independence indication information carried in the bitstream, whether video data of each viewpoint in the video data of the target viewpoint depends on video data of other views during codec, and then add the codec independence indication information to each generated video track.

In some embodiments, if the codec independence indication information is carried in the bitstream of the video data of the target viewpoint, in the embodiments of this disclosure, the bitstream syntax of the free viewpoint video is extended. Using the 6DoF video as an example, details are shown in Table 8:

TABLE 8

| 6DoF video expression syntax | Descriptor |
|---|---|
| 6dof_extension( ) { | |
| codec_independency | u(8) |
| marker_bit | f(1) |
| texture_padding_size | u(8) |
| depth_padding_size | u(8) |
| camera_number | i(16) |
| camera_model | u(8) |
| camera_resolution_x | f(32) |
| camera_resolution_y | f(32) |
| video_resolution_x | f(32) |
| video_resolution_y | f(32) |
| camera_translation_matrix[3] | f(32) |
| camera_rotation_matrix [3][3] | f(32) |
| camera_focal_length_x | f(32) |
| camera_focal_length_y | f(32) |
| camera_principle_point_x | f(32) |
| camera_principle_point_y | f(32) |
| texture_top_left_x[camera_number] | u(32) |
| texture_top_left_y[camera_number] | u(32) |
| texture_bottom_right_x[camera_number] | u(32) |
| texture_bottom_right_y[camera_number] | u(32) |
| depth_top_left_x[camera_number] | u(32) |
| depth_top_left_y[camera_number] | u(32) |
| depth_bottom_right_x[camera_number] | u(32) |
| depth_bottom_right_y[camera_number] | u(32) |
| depth_range_near | f(32) |
| depth_range_far | f(32) |
| depth_scale_flag | u(8) |
| background_texture_flag | u(8) |
| background_depth_flag | u(8) |
| } | |

As shown in Table 8, a field in the bitstream syntax of the free viewpoint video in the embodiments of this disclosure is deleted: 6DoF video stitching_layout. The stitching_layout is an 8-bit unsigned integer, and is used to identify whether the stitching layout of the texture map and the depth map is used in the 6DoF video. Specific values are shown in Table 9.

TABLE 9

| A value of stitching_layout | 6DoF video stitching layout |
|---|---|
| 0 | Depth map and texture map are stitched and encoded |
| 1 | Depth map and texture map are respectively encoded |
| Another | Reserved |

Correspondingly, the codec_independency field is added in the bitstream syntax of the free viewpoint video shown in Table 8. codec_independency is an 8-bit unsigned integer, and is used to identify the codec independence between the texture map and the depth map corresponding to each camera of the 6DoF video. Specific values are shown in Table 10.

TABLE 10

| A value of codec_independency | Codec independence |
|---|---|
| 0 | Texture map data of the single viewpoint depends on texture map data and depth map data of other viewpoints during codec, or depth map data of the single viewpoint depends on texture map data and depth map data of other viewpoints during codec. |
| 1 | The texture map data of the single viewpoint depends on the texture map data of other viewpoints during codec, and the depth map data of the single viewpoint depends on the depth map data of other viewpoints during codec. |
| 2 | The texture map data and the depth map data of the single viewpoint do not depend on the texture map data and the depth map data of other views during codec, and the texture map data and the depth map data of the single viewpoint do not depend on each other during codec. |
| 3 | The texture map data and the depth map data of the single viewpoint do not depend on the texture map data and the depth map data of other views during codec, and the texture map data and the depth map data of the single viewpoint do not depend on each other during codec. |
| Another | Reserved |

Various fields in Table 8 are introduced below:

A marker bit is a binary variable. A value is 1, and is used to avoid a false start code in a 6DoF video format extension bitstream.

A texture_padding_size is an 8-bit unsigned integer. The texture_padding_size indicates a number of pixels for texture padding, and a value ranges from 0 to 255.

Depth_padding_size is an 8-bit unsigned integer. The depth_padding_size indicates a number of pixels for depth padding, and a value ranges from 0 to 255.

Camera_number is an 8-bit unsigned integer, and a value ranges from 1 to 255. The camera_number is used for indicating a number of capturing cameras for the 6DoF video.

Camera_model is an 8-bit unsigned integer, and a value ranges from 1 to 255. The camera_model is used for indicating a model type of the camera. The 6DoF video camera model is shown in Table 11:

TABLE 11

| Camera model | 6DoF video camera model |
|---|---|
| 0 | Pinhole model |
| 1 | Fisheye model |
| Another | Reserved |

Camera_resolution_x is a 32-bit unsigned integer. The camera_resolution_x indicates a resolution in an x direction captured by the camera.

Camera_resolution_y is a 32-bit unsigned integer. The camera_resolution_y indicates a resolution in a y direction captured by the camera.

6DoF video_resolution_x is a 32-bit unsigned integer. The 6DoF video_resolution_x indicates a resolution in an x direction.

6DoF video_resolution_y is a 32-bit unsigned integer. The 6DoF video_resolution_y indicates a resolution in a y direction.

A camera_translation_matrix[3] is a matrix of 3*32-bit floating point numbers, and represents the translation matrix of the camera.

The camera_rotation_matrix[3][3] is a matrix of 9*32-bit floating point numbers, and represents a rotation matrix of the camera.

The camera_focal_length_x is a 32-bit floating point number. The camera_focal_length_x indicates a focal length fx of the camera.

The camera_focal_length_y is a 32-bit floating point number. The camera_focal_length_y indicates a focal length fy of the camera.

A camera_principle_point_x is a 32-bit floating point number. The camera_principle_point_x indicates an offset px of an optical axis of the camera in an image coordinate system.

A camera_principle_point_y is a 32-bit floating point number. The camera_principle_point_y indicates an offset py of an optical axis of the camera in an image coordinate system.

A texture_top_left_x[camera_number] is an array of the 32-bit unsigned integer. A size of the array is the camera_number, which indicates an x coordinate on an upper left corner of a texture map of a camera with a corresponding serial number in a 6DoF video frame.

A texture_top_left_y[camera_number] is an array of the 32-bit unsigned integer. A size of the array is the camera_number, which indicates a y coordinate on an upper left corner of a texture map of a camera with a corresponding serial number in a 6DoF video frame.

A texture_bottom_right_x[camera_number] is an array of the 32-bit unsigned integer. A size of the array is the camera_number, which indicates an x coordinate on a lower right corner of a texture map of a camera with a corresponding serial number in a 6DoF video frame.

A texture_bottom_right_y[camera_number] is an array of the 32-bit unsigned integer. A size of the array is the camera_number, which indicates a y coordinate on a lower right corner of a texture map of a camera with a corresponding serial number in a 6DoF video frame.

A depth_top_left_x[camera_number] is an array of the 32-bit unsigned integer. A size of the array is the camera_number, which indicates an x coordinate on an upper left corner of a depth map of a camera with a corresponding serial number in a 6DoF video frame.

A depth_top_left_y[camera_number] is an array of the 32-bit unsigned integer. A size of the array is the camera_number, which indicates a y coordinate on an upper left corner of a depth map of a camera with a corresponding serial number in a 6DoF video frame.

A depth_bottom_right_x[camera_number] is an array of the 32-bit unsigned integer. A size of the array is the camera_number, which indicates an x coordinate on a lower right corner of a depth map of a camera with a corresponding serial number in a 6DoF video frame.

A depth_bottom_right_y[camera_number] is an array of the 32-bit unsigned integer. A size of the array is the camera_number, which indicates a y coordinate on a lower right corner of a depth map of a camera with a corresponding serial number in a 6DoF video frame.

A depth_range_near used for depth map quantization is a 32-bit floating point number. A depth range minimum value from an optical center is used for depth map quantization.

A depth_range_far used for depth map quantization is a 32-bit floating point number. A depth range maximum value from an optical center is used for depth map quantization.

A depth_scale_flag is an 8-bit unsigned integer, and a value ranges from 1 to 255. The depth_scale_flag is used for indicating the depth map.

A background_texture_flag is an 8-bit unsigned integer, and is used for indicating whether to transmit background texture maps of a plurality of cameras.

A background_depth_flag is an 8-bit unsigned integer, and is used for indicating whether to transmit background depth maps of a plurality of cameras.

If a background depth is applied, a decoded depth map background frame does not participate in viewpoint synthesis, and subsequent frames participate in virtual viewpoint synthesis. The depth_scale_flag is shown in Table 12:

TABLE 12

| depth_scale_flag | Depth_scale_flag |
|---|---|
| 0 | A depth map retains an original resolution |
| 1 | Depth map ¼ downsampling |
| 2 | Depth map ¹⁄₁₆ downsampling |
| 3 | Reserved |

It may be learnt from the above that the first device, according to whether video data of a single viewpoint in M viewpoints corresponding to a video track depends on video data of other views during codec, determines a specific value of the codec independence indication information, and adds the specific value of the codec independence indication information to the video track.

In some embodiments, in a case that video data corresponding to each of the N viewpoints does not depend on video data corresponding to other views during encoding, and an encapsulation mode of a bitstream of the free viewpoint video data is a single-track encapsulation mode, the first device adds the codec independence indication information to a free viewpoint information data box of a video track formed in the single-track encapsulation mode, where the value of the codec independence indication information is the third value or the fourth value. In this way, the server or client may determine, according to the value of the codec independence indication information, that the video data corresponding to each of the N viewpoints does not depend on the video data corresponding to other viewpoints during encoding, and may further request media files corresponding to some views to be decapsulated, or re-encapsulate a video track encapsulated in the single-track mode into a plurality of video tracks.

S503. The first device transmits a media file of free viewpoint video data to a client or a server.

According to the foregoing method, the first device encapsulates the bitstream of the free viewpoint video data into at least one video track, to obtain a media file of the free viewpoint video data, ands add the codec independence indication information to the video track. Next, the first device transmits the media file including the codec independence indication information to the client or server, so that the client or server processes the media file according to the codec independence indication information carried in the media file. For example, the codec independence indication information indicates that video data corresponding to a single viewpoint does not depend on video data corresponding to other views during encoding, then the client or server may request media files corresponding to some viewpoints to be decapsulated, or re-encapsulate a video track encapsulated in the single-track mode into a plurality of video tracks.

In the file encapsulation method for the free viewpoint video provided in the embodiments of this disclosure, the codec independence indication information is added to the video track. The codec independence indication information is used for indicating whether the video data of the single viewpoint in the M viewpoints corresponding to the video track depends on the video data of other viewpoints during codec. In this way, in the single-track encapsulation mode, the client may determine, according to the codec independence indication information, whether a texture map and a depth map of a specific camera may be partially decoded. In addition, in the single-track encapsulation mode, the server may also determine whether a single-track encapsulated free viewpoint video may be re-encapsulated according to a multi-track according to the codec independence indication information, thereby improving processing flexibility of the media file.

In some embodiments, in a case that an encoding manner of the free viewpoint video data is an AVS3 encoding mode, the media file in the embodiments of this disclosure may be encapsulated in the form of the subsample. In this case, the method in the embodiments of this disclosure further includes:

S500. Encapsulate at least one of header information, texture map information corresponding to at least one viewpoint, and depth map information corresponding to at least one viewpoint required for decoding in the media file in a form of a subsample.

a subsample data box includes a subsample data box flag and subsample indication information, the subsample data box flag is configured to indicate a division manner of the subsample, and the subsample indication information is used for indicating content (content type) included in the subsample.

The content (content type) included in the subsample includes at least one of header information, texture map information corresponding to at least one viewpoint, and depth map information corresponding to at least one viewpoint required for decoding.

In some embodiments, in a case that a value of the subsample indication information is a fifth value, it indicates that one subsample includes the header information required for decoding; or in a case that a value of the subsample indication information is a sixth value, it indicates that one subsample includes texture map information corresponding to N viewpoints (or a camera) in a current video frame; or in a case that a value of the subsample indication information is a seventh value, it indicates that one subsample includes depth map information corresponding to N viewpoints (or a camera) in a current video frame; or in a case that a value of the subsample indication information is an eighth value, it indicates that one subsample includes texture map information and depth map information corresponding to one viewpoint (or a camera) in a current video frame; or in a case that a value of the subsample indication information is a ninth value, it indicates that one subsample includes texture map information corresponding to one viewpoint (or a camera) in a current video frame; or in a case that a value of the subsample indication information is a tenth value, it indicates that one subsample includes depth map information corresponding to one viewpoint (or a camera) in a current video frame.

The current video frame is formed by stitching video frames corresponding to the N viewpoints. For example, video frames corresponding to N viewpoints captured by N cameras at a same time point are stitched to form the current video frame.

The texture map information and/or depth map information may be understood as data required for decapsulating a texture map bitstream or a depth map bitstream.

In an embodiment, the texture map information and/or depth map information includes a location offset of the texture map bitstream and/or depth map bitstream in the media file. For example, a texture map bitstream corresponding to each viewpoint is saved at an end location of the media file. Texture map information corresponding to a viewpoint 1 includes an offset of the texture map information corresponding to the viewpoint 1 at the end location in the media file. According to the offset, the location of the texture map bitstream corresponding to the viewpoint 1 in the media file may be obtained.

In an example, a corresponding relationship between the value of the subsample indication information and content included in the subsample is shown in Table 13:

TABLE 13

| A value of subsample indication information | Content included in a subsample |
|---|---|
| Fifth value | Header information required for decoding is included in a subsample |
| Sixth value | Texture map information corresponding to N viewpoints in a current video frame is included in a subsample |
| Seventh value | Depth map information corresponding to N viewpoints in a current video frame is included in a subsample |
| Eighth value | Texture map information and depth map information corresponding to one viewpoint in a current video frame are included in a subsample |

TABLE 13-continued

| A value of subsample indication information | Content included in a subsample |
|---|---|
| Ninth value | Texture map information corresponding to one viewpoint in a current video frame is included in a subsample |
| Tenth value | Depth map information corresponding to one viewpoint in a current video frame is included in a subsample |
| Another | Reserved |

The embodiments of this disclosure do not limit specific values of the fifth value, the sixth value, the seventh value, the eighth value, the ninth value, and the tenth value, which are specifically determined according to actual needs.

In an embodiment, the fifth value is 0.
In an embodiment, the sixth value is 1.
In an embodiment, the seventh value is 2.
In an embodiment, the eighth value is 3.
In an embodiment, the ninth value is 4.
In an embodiment, the tenth value is 5.

In an embodiment, a value of a flags field of a subsample data box is a preset value, for example, 1, indicating that the subsample includes valid content.

In some embodiments, the subsample indication information is represented by payloadType in a codec_specific_parameters field in a SubSampleInformationBox data box.

In an example, a value of the codec_specific_parameters field in the SubSampleInformationBox data box is as follows:

```
if (flags == 0) {
    unsigned int(8)    payloadType;
    if(payloadType >= 3){
        unsigned int(8) camera_id
        bit(16) reserved = 0;
    }
    else{
        bit(24)   reserved = 0;
    }
}
```

A value of the payloadType field is shown in Table 14 below:

TABLE 14

| A value of payloadType | Meaning |
|---|---|
| 0 | Header information required for decoding is included in a subsample |
| 1 | Texture map information corresponding to N viewpoints in a current video frame is included in a subsample |
| 2 | Depth map information corresponding to N viewpoints in a current video frame is included in a subsample |
| 3 | Texture map information and depth map information corresponding to one viewpoint in a current video frame are included in a subsample |
| 4 | Texture map information corresponding to one viewpoint in a current video frame is included in a subsample |
| 5 | Depth map information corresponding to one viewpoint in a current video frame is included in a subsample |
| Another | Reserved |

In some embodiments, in a case that the encoding manner of the free viewpoint video data is the AVS3 encoding mode, the video data corresponding to each of the N viewpoints does not depend on the video data corresponding to other views during encoding, and the encapsulation mode of the bitstream of the free viewpoint video data is the single-track encapsulation mode, S500 includes S500-A below:

S500-A. The first device encapsulates at least one of the texture map information and the depth map information corresponding to each of the N viewpoints in the media file in the form of the subsample.

Each subsample formed above includes a subsample data box including a subsample data box flag and subsample indication information.

A value of the subsample data box flag is a preset value, for example, for example, 1, indicating that the subsample is divided into subsamples in a unit of a viewpoint.

A value of the subsample indication information is determined according to content included in the subsample, which may specifically include the following examples:

Example 1. If the subsample includes texture map information and depth map information corresponding to one viewpoint in the current video frame, a value of the subsample indication information corresponding to the subsample is an eighth value.

Example 2. If the subsample includes texture map information corresponding to one viewpoint in the current video frame, a value of the subsample indication information corresponding to the sub sample is a ninth value.

Example 3. If the subsample includes depth map information corresponding to one viewpoint in the current video frame, a value of the subsample indication information corresponding to the sub sample is a tenth value.

In the embodiments of this disclosure, in a case that the encoding manner of the free viewpoint video data is the AVS3 encoding mode, the video data corresponding to each of the N viewpoints does not depend on the video data corresponding to other views during encoding, and the encapsulation mode of the bitstream of the free viewpoint video data is the single-track encapsulation mode, the texture map information and the depth map information corresponding to each of the N viewing angles are encapsulated in the media file in the form of subsamples. In this case, it is convenient for the client to decode some viewpoints as required after requesting the complete free viewpoint video, so as to save computing resources of the client.

Figure 6:
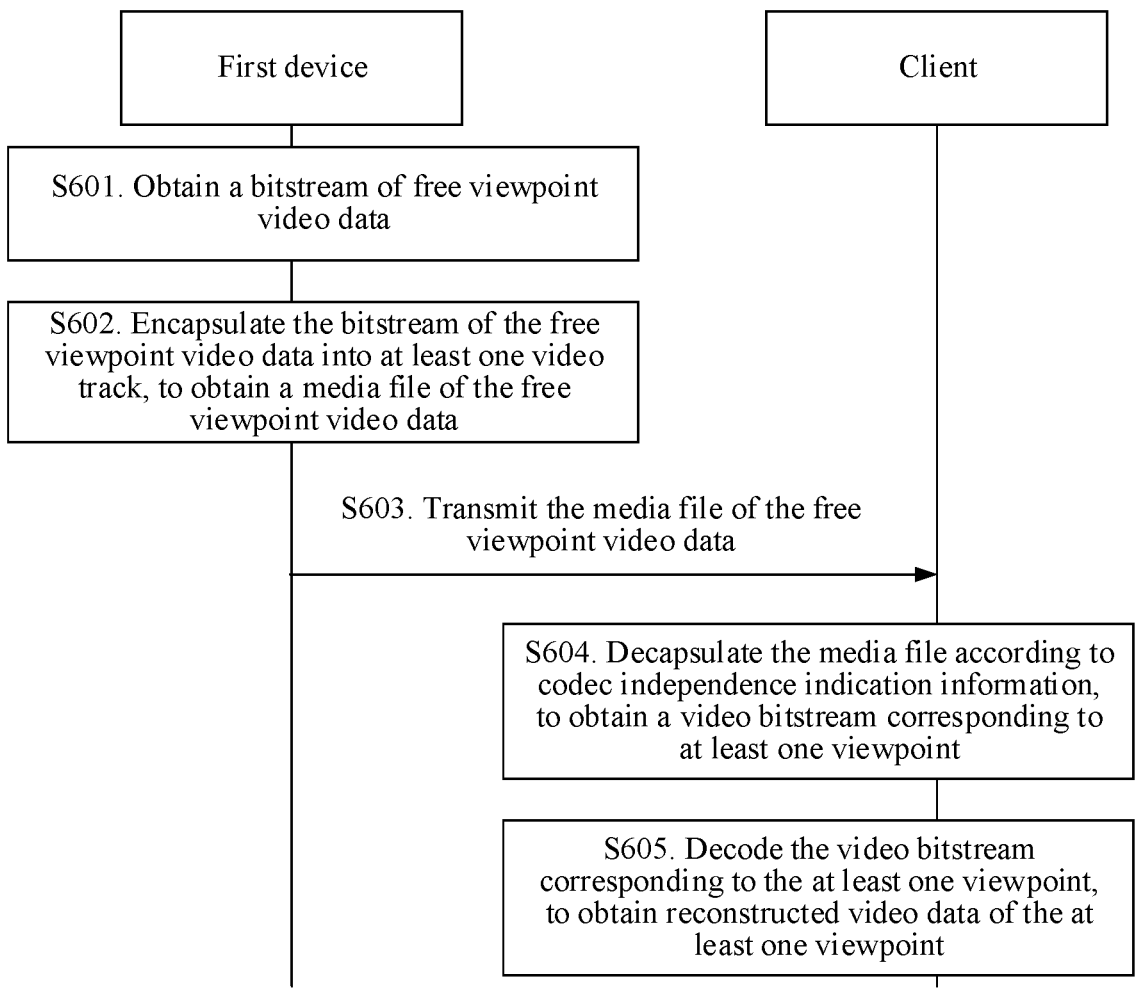
FIG. 6 is an interactive flowchart of a file encapsulation method for a free viewpoint video according to an embodiment of this disclosure.

With reference to FIG. 5, the file encapsulation method for the free viewpoint video on the first device side is introduced above. With reference to FIG. 6, an interaction process between the first device and the client is introduced below.

FIG. 6 is an interactive flowchart of a file encapsulation method for a free viewpoint video according to an embodiment of this disclosure. As shown in FIG. 6, the method includes the following steps:

S601. A first device obtains a bitstream of free viewpoint video data.

The free viewpoint video data includes video data of N viewpoints, and N is a positive integer.

S602. The first device encapsulates the bitstream of the free viewpoint video data into at least one video track, to obtain a media file of the free viewpoint video data.

The video track includes codec independence indication information and video bitstreams of M viewpoints, the codec independence indication information is used for indicating whether video data of a single viewpoint in M viewpoints corresponding to the video track depends on video data of other viewpoints during codec, and M is a positive integer less than or equal to N.

S603. The first device transmits a media file of free viewpoint video data to a client.

An execution process of S601 to S603 is consistent with a process of S501 to S503, refer to the specific description of S501 to S503, and details are not repeated herein.

S604. The client decapsulates the media file according to the codec independence indication information, to obtain a video bitstream corresponding to at least one of the M viewpoints.

The codec independence indication information is added to the media file of this disclosure. The codec independence indication information is used for indicating whether the video data of the single viewpoint depends on the video data of other views during codec. In this way, after receiving the media file, the client may determine, according to the codec independence indication information carried in the media file, whether single-viewpoint video data corresponding to the media file depends on video data of other views during codec. If it is determined that the single-viewpoint video data corresponding to the media file depends on video data from other viewpoints during codec, it means that a media file corresponding to a single viewpoint cannot be decapsulated. Therefore, the client needs to decapsulate media files corresponding to all viewpoints in the media file, to obtain video bitstreams corresponding to the N viewpoints.

If the client determines that the single-viewpoint video data corresponding to the media file does not depend on the video data of other viewpoints during codec, it means that the media file corresponding to the single viewpoint in the media file may be decapsulated. In this way, the client may decapsulate media files of some viewpoints as required, to obtain video bitstreams corresponding to some viewpoints, thereby saving computing resources of the client.

It may be learnt from Table 4 that the codec independence indication information uses different values to indicate whether the video data of the single viewpoint depends on the video data of other viewpoints during codec. In this way, the client may determine, according to a value of the codec independence indication information, and with reference to Table 4, whether the video data of the single viewpoint in the N viewpoints corresponding to the media file depends on the video data of other viewpoints during codec.

In some embodiments, S604 includes the following steps:

S604-A1. The client obtains a viewing angle of a user in a case that the value of the codec independence indication information is the third value or the fourth value, and an encapsulation mode of the bitstream is a single-track encapsulation mode;

S604-A1. The client determines a target viewpoint corresponding to the viewing angle of the user according to the viewing angle of the user and the viewpoint information in the media file; and S604-A1. The client decapsulates a media file corresponding to the target viewpoint, to obtain a video bitstream corresponding to the target viewpoint.

In the embodiments of this disclosure, if a value of the codec independence indication information carried in the media file is a third value or a fourth value, as shown in Table 4, the third value is used for indicating that texture map data or depth map data of the single viewpoint does not depend on texture map data or depth map data of other views during codec, and the texture map data and the depth map data of the single viewpoint depend on each other during codec. The fourth value is used for indicating that texture map data or depth map data of the single viewpoint does not depend on texture map data or depth map data of other viewpoints during codec, and the texture map data and the depth map data of the single viewpoint depend on each other during codec. It may be learnt that if the value of the codec independence indication information carried in the media file is the third value or the fourth value, it indicates that the texture map data or the depth map data of each viewpoint in the media file does not depend on the texture map data or the depth map data of other viewpoints during codec. In this way, the client may separately decode the texture map data and/or the depth map data of some viewpoints as required.

Specifically, the client determines the target viewpoint that matches the viewing angle of the user according to the viewing angle of the user and the viewpoint information in the media file, and decapsulates the media file corresponding to the target viewpoint, to obtain a video bitstream corresponding to the target viewpoint. In the embodiments of this disclosure, the media file corresponding to the target viewpoint is decapsulated, a manner of obtaining the video bitstream corresponding to the target viewpoint is not limited, and any existing manner may be used. For example, the client determines a location of the video bitstream corresponding to the target viewpoint in the media file according to information corresponding to the target viewpoint in the media file, and then decapsulates the video bitstream corresponding to the target viewpoint, to obtain the video bitstream corresponding to the target viewpoint, so that the video data corresponding to some viewpoints is decoded, thereby saving computing resources of the client.

In some embodiments, if a value of the codec independence indication information is a first value or a second value, it indicates that the texture map data and/or the depth map data of each viewpoint in the media file depend on the texture map data and/or the depth map data of other viewpoints during codec. In this case, the client needs to decapsulate the media files corresponding to all the viewpoints in the N viewpoints in the media file.

S605. The client decodes the video bitstream corresponding to the at least one viewpoint, to obtain reconstructed video data of the at least one of the M viewpoints.

After the video bitstream corresponding to at least one viewpoint is obtained according to the foregoing manner, the client may decode the video bitstream corresponding to the at least one viewpoint, and render the decoded video data.

For a process of decoding the video bitstream, reference may be made to the description in the related art, and details will not be repeated herein.

In some embodiments, if the encoding manner is an AVS3 video encoding manner, and the media file includes a subsample, then S605 includes:

S605-A1. The client obtains the subsample data box flag and the subsample indication information included in a subsample data box.

It may be learnt from S500 that the first device may encapsulate header information, texture map information corresponding to at least one viewpoint, and depth map information corresponding to at least one viewpoint required for decoding in the media file in a form of a subsample. Based on this, after the client receives the media file and detects that the media file includes the subsample, the client obtains the subsample data box flag and the subsample indication information included in the subsample data box.

The subsample data box flag is configured to indicate a division manner of the subsample, and the subsample indication information is used for indicating content included in the sub sample.

The content included in the subsample includes at least one of header information, texture map information corresponding to at least one viewpoint, and depth map information corresponding to at least one viewpoint required for decoding.

S605-A2. The client obtains the content included in the subsample according to the subsample data box flag and the subsample indication information.

For example, when a value of the subsample data box flag is 1, it indicates that the subsample includes valid content. Next, based on a corresponding relationship between the subsample indication information and the content included in the subsample shown in Table 13, the client queries the content included in the subsample corresponding to the subsample indication information in Table 13.

S605-A3. The client decapsulates the media file resource according to the content included in the subsample and the codec independence indication information, to obtain the video bitstream corresponding to the at least one viewpoint.

The content included in the subsample is shown in Table 13, and the value and the indicated information of the codec independence indication information are shown in Table 4. In this way, the client may decapsulate a media file resource according to whether the video data of the single viewpoint depends on the video data of other viewpoints during codec indicated by the codec independence indication information, to obtain the video bitstream corresponding to the at least one viewpoint.

For example, the codec independence indication information is used for indicating that the video data of the single viewpoint does not depend on the video data of other viewpoints during codec, and the content included in the subsample is the header information required for decoding. In this way, after obtaining the video bitstream corresponding to the target viewpoint according to the codec independence indication information, the client decodes the video bitstream corresponding to the target viewpoint according to the header information required for decoding included in the subsample.

In another example, the codec independence indication information is used for indicating that the video data of the single viewpoint depends on the video data of other viewpoints during codec, and the content included in the subsample is all texture map information in the current video frame. In this way, after obtaining video bitstreams corresponding to all views according to the codec independence indication information, the client decodes the video bitstreams corresponding to all viewpoints according to all texture map information in the current video frame included in the subsample.

In the embodiments of this disclosure, after Table 4 and Table 13 are provided, the client may decapsulate the media file resource in an existing manner according to the content included in the subsample and the codec independence indication information, which are not described one by one by using examples.

In some embodiments, if the media file includes a subsample corresponding to each of the N viewpoints, S605-A3 includes:

S605-A31. The client determines the target viewpoint according to the viewing angle of the user and the viewpoint information in the media file in a case that the value of the codec independence indication information is the third value or the fourth value, and the encapsulation mode of the bitstream is the single-track encapsulation mode;

S605-A32. The client obtains the subsample data box flag and the subsample indication information included in a target subsample data box corresponding to the target viewpoint;

S605-A33. The client determines content included in the target subsample according to the subsample data box flag and the subsample indication information included in the target subsample data box; and S605-A34. The client decapsulates a media file corresponding to the target viewpoint according to the content included in the target subsample, to obtain the video bitstream corresponding to the target viewpoint.

Specifically, in a case that the value of the codec independence indication information is the third value or the fourth value, it means that the video data of each viewpoint in the media file does not depend on the video data of other viewpoints during codec. In this way, the client determines the target viewpoint according to the viewing angle of the user and the viewpoint information in the media file. Next, the client obtains the target subsample corresponding to the target viewpoint from the subsample corresponding to each of the N viewpoints, then obtains the subsample data box flag and the subsample indication information included in the target subsample data box, and determines content included in the target subsample according to the subsample data box flag and the subsample indication information included in the target subsample data box. For example, the subsample data box flag is 1, and a value of the subsample indication information is 3. As shown in Table 13, it may be determined that the content included in the target subsample is the texture map information and the depth map information corresponding to a single camera in the current video frame. Next, the client decapsulates the media file corresponding to the target viewpoint according to the content included in the target subsample, to obtain the video bitstream corresponding to the target viewpoint. For example, the client obtains a location of the video bitstream corresponding to the target viewpoint in the media file according to the texture map information and the depth map information included in the target subsample, and further decapsulates the video bitstream corresponding to the target viewpoint in the media file, to obtain the video bitstream corresponding to the target viewpoint.

In the embodiments of this disclosure, the first device adds the codec independence indication information in the video track. The codec independence indication information is used for indicating whether the video data of a single viewpoint in the M viewpoints corresponding to the video track depends on the video data of other viewpoints during codec. In this way, in the single-track encapsulation mode, the client may determine, according to the codec independence indication information, whether a texture map and a depth map of a specific camera may be partially decoded. In this way, processing flexibility of the media file by the client is improved, and when the client decodes some media files according to the codec independence indication information, computing resources of the client may be saved.

Figure 7:
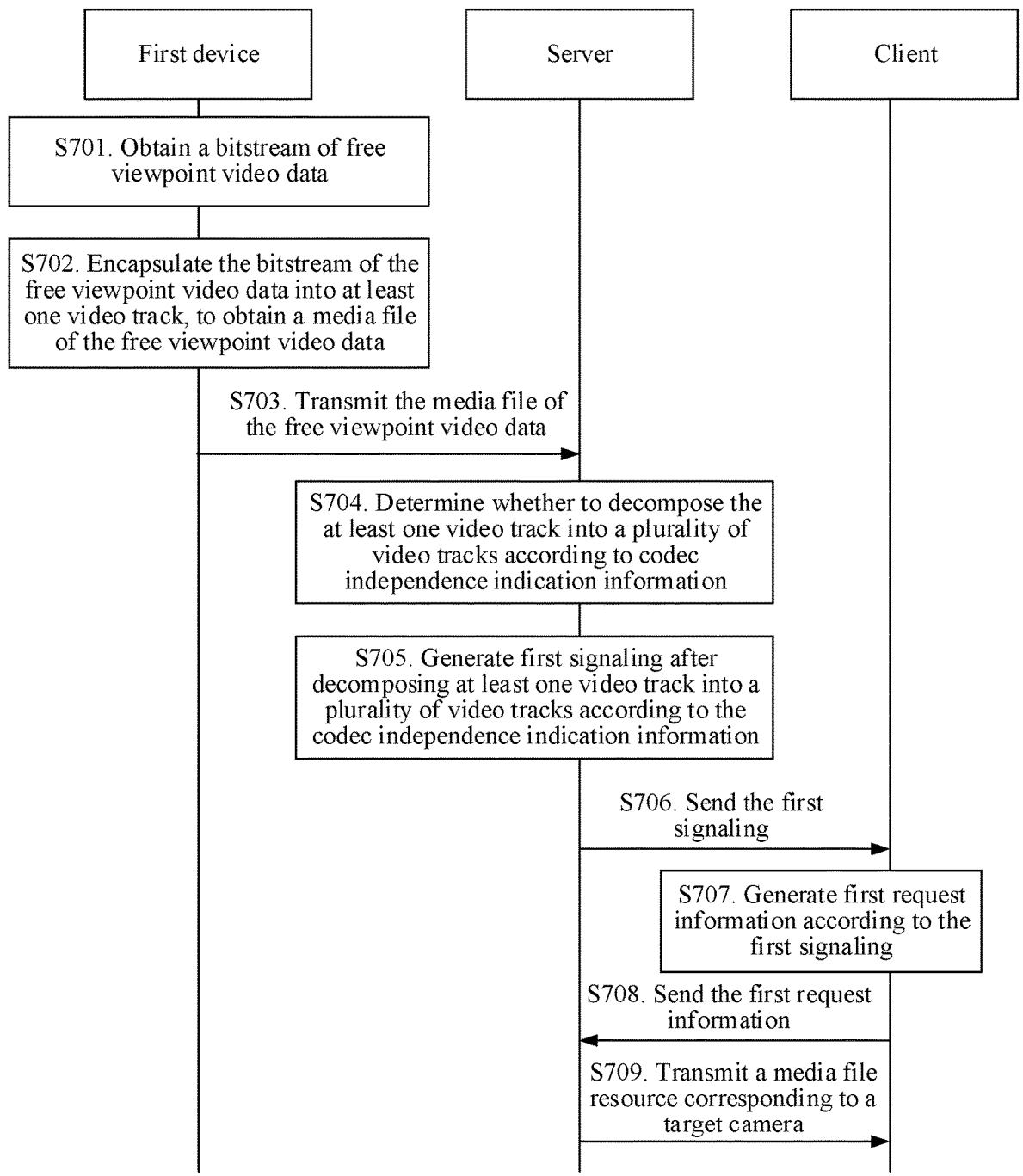
FIG. 7 is an interactive flowchart of a file encapsulation method for a free viewpoint video according to an embodiment of this disclosure.

With reference to FIG. 7, an exchange process between the first device and the server is introduced below.

FIG. 7 is an interactive flowchart of a file encapsulation method for a free viewpoint video according to an embodiment of this disclosure. As shown in FIG. 7, the method includes the following steps:

S701. A first device obtains a bitstream of free viewpoint video data.

The free viewpoint video data includes video data of N viewpoints, and N is a positive integer.

S702. The first device encapsulates the bitstream of the free viewpoint video data into at least one video track, to obtain a media file of the free viewpoint video data.

The video track includes codec independence indication information and video bitstreams of M viewpoints, the codec independence indication information is used for indicating whether video data of a single viewpoint in M viewpoints corresponding to the video track depends on video data of other viewpoints during codec, and M is a positive integer less than or equal to N.

S703. The first device transmits a media file of free viewpoint video data to a server.

An execution process of S701 to S703 is consistent with a process of S501 to S503, refer to the specific description of S501 to S503, and details are not repeated herein.

S704. The server determines whether to decompose the at least one video track into a plurality of video tracks according to the codec independence indication information.

In some embodiments, in a case that the value of the codec independence indication information is the third value or the fourth value, and an encapsulation mode of the bitstream is a single-track encapsulation mode, the server encapsulates one video track formed in the single-track encapsulation mode into N video tracks according to the multi-track encapsulation mode, and each video track in the N video tracks includes the video data corresponding to the single viewpoint.

In some embodiments, if the value of the codec independence indication information is the first value or the second value, and an encapsulation mode of the bitstream is a single-track encapsulation mode, the server cannot encapsulate one video track formed by the single-track encapsulation mode into N video tracks.

In some embodiments, if the encoding manner of the free viewpoint video data is the AVS3 video encoding manner, and the media file includes the subsample corresponding to each of the N viewpoints, the subsample corresponding to each viewpoint includes at least one of the depth map information and the texture map information corresponding to each viewpoint. In this case, S704 includes:

S704-A1. For each of the N viewpoints, the server obtains the subsample data box flag and the subsample indication information included in the subsample data box corresponding to the viewpoint, the subsample data box flag is configured to indicate a division manner of the subsample, and the subsample indication information is used for indicating content included in the subsample;

S704-A2. The server obtains the content included in the subsample corresponding to each viewpoint according to the subsample data box flag corresponding to each viewpoint and the subsample indication information; and S704-A3. According to the content included in the subsample corresponding to each viewpoint, the server encapsulates one video track formed in the single-track encapsulation mode into N video tracks according to the multi-track encapsulation mode.

For example, using a single viewpoint in the N viewpoints as an example, the subsample data box corresponding to the viewpoint includes a value of the subsample data box flag being 1, and a value of the subsample indication information being 3. It may be learnt from Table 13 that the value of the subsample indication information being 3 indicates that the subsample includes the texture map information and the depth map information corresponding to the viewpoint. In this way, according to the texture map information and the depth map information corresponding to the viewpoint, the server queries the video bitstream corresponding to the viewpoint in a single video track formed in the single-track encapsulation mode. Based on the same manner, the server may query the video bitstream corresponding to each of the N viewpoints, and encapsulate each corresponding video bitstream into one video track, to obtain N video tracks.

In some embodiments, after the server decomposes the single video track into a plurality of video tracks according to the codec independence indication information, the method in the embodiments of this disclosure further includes:

S705. The server generates first signaling after decomposing at least one video track into a plurality of video tracks according to the codec independence indication information.

In an example, if N=3, the server encapsulates a single-track video file into three video tracks Track1, Track2 and Track3, and details are as follows:

Track1: {Camera1: ID=1; Pos=(100,0,100); Focal=(10, 20)};

Track2: {Camera2: ID=2; Pos=(100,100,100); Focal=(10, 20)}; and

Track3: {Camera3: ID=3; Pos=(0,0,100); Focal= (10,20)}.

The first signaling includes at least one of an identifier of a camera corresponding to each track in the N video tracks, location information of the camera, and focus information of the camera.

In an example, the first signaling includes three representations of Representation1, Representation2 and Representation3, and details are as follows:

Representation1: {Camera1: ID=1; Pos=(100,0,100); Focal=(10,20)};

Representation2: {Camera2: ID=2; Pos=(100,100,100); Focal=(10,20)}; and

Representation3: {Camera3: ID=3; Pos=(0,0,100); Focal=(10,20)}.

S706. The server transmits the first signaling to the client.

S707. The client generates first request information according to the first signaling. For example, the client selects a video file corresponding to a target camera and requests the video file according to location information of the user and shooting location information of each viewpoint (namely, location information of the camera) in the first signaling.

For example, the target cameras are a Camera 2 and a Camera 3.

S708. The client transmits the first request information to the server, where the first request information includes identification information of the target camera.

S709. The server transmits a media file resource corresponding to the target camera to the client according to the first request information.

In the embodiments of this disclosure, when determining that the video track corresponding to the single-track mode may be decomposed into a plurality of video tracks according to the codec independence indication information, the server decomposes the video track corresponding to the single-track mode into a plurality of video tracks, so as to support the client to request media resources corresponding to some viewpoints, and achieve an objective of partial transmission and partial decoding.

It is to be understood that FIG. 5 to FIG. 7 are only examples of this disclosure, and should not be construed as a limitation to this disclosure.

The exemplary implementations of this disclosure are described above in detail with reference to the accompanying drawings, but this disclosure is not limited to the specific details in the above implementations. Various simple variations may be made to the technical solutions of this disclosure within the scope of the technical idea of this disclosure, and such simple variations shall all fall within the protection scope of this disclosure. For example, the specific technical features described in the above specific embodiments may be combined in any suitable manner without contradiction. To avoid unnecessary repetition, various possible combinations are not further described in this disclosure. In another example, different implementations of this disclosure may also be combined without departing from the idea of this disclosure, and these combinations shall still be regarded as content disclosed in this disclosure.

With reference to FIG. 5 to FIG. 7, the method embodiment of this disclosure is described in detail above, and with reference to FIG. 8 to FIG. 11, the apparatus embodiment of this disclosure is described in detail below.

Figure 8:
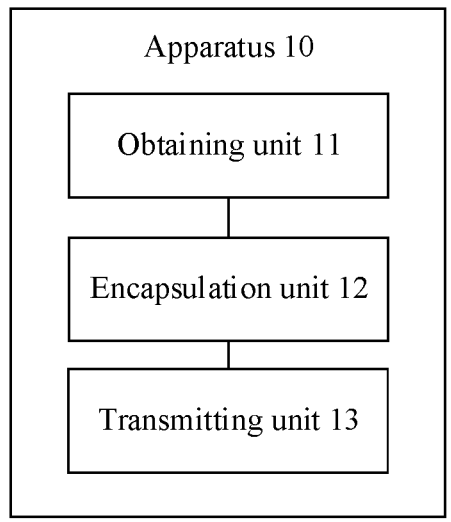
FIG. 8 is a schematic diagram of a structure of a file encapsulation apparatus for a free viewpoint video according to an embodiment of this disclosure.

FIG. 8 is a schematic diagram of a structure of a file encapsulation apparatus for a free viewpoint video according to an embodiment of this disclosure. The apparatus 10 is applied to a first device, and the apparatus 10 includes:

an obtaining unit 11, configured to obtain a bitstream of free viewpoint video data, the free viewpoint video data including video data of N viewpoints, and N being a positive integer;

an encapsulation unit 12, configured to encapsulate the bitstream of the free viewpoint video data into at least one video track, to obtain a media file of the free viewpoint video data, the video track including codec independence indication information and video bitstreams of M viewpoints, the codec independence indication information being used for indicating whether video data of a single viewpoint in M viewpoints corresponding to the video track depends on video data of other viewpoints during codec, and M being a positive integer less than or equal to N; and a transmitting unit 13, configured to transmit the media file of the free viewpoint video data to a client or a server.

In an embodiment, the video data includes at least one of texture map data and depth map data.

In some embodiments, in a case that a value of the codec independence indication information is a first value, it indicates that texture map data of the single viewpoint depends on texture map data and depth map data of other views during codec, or depth map data of the single viewpoint depends on texture map data and depth map data of other views during codec; or in a case that a value of the codec independence indication information is a second value, it indicates that texture map data of the single viewpoint depends on texture map data of other views during codec, and depth map data of the single viewpoint depends on depth map data of other views during codec; or in a case that a value of the codec independence indication information is a third value, it indicates that texture map data and depth map data of the single viewpoint do not depend on texture map data and depth map data of other views during codec, and the texture map data and the depth map data of the single viewpoint depend on each other during codec; or in a case that a value of the codec independence indication information is a fourth value, it indicates that texture map data and depth map data of the single viewpoint do not depend on texture map data and depth map data of other viewpoints during codec, and the texture map data and the depth map data of the single viewpoint do not depend on each other during codec.

In some embodiments, the encapsulation unit 12 is configured to use a single-track encapsulation mode to encapsulate the bitstream of the free viewpoint video data into one video track.

In some embodiments, in a case that video data corresponding to each of the N viewpoints does not depend on video data corresponding to other viewpoints during encoding, and an encapsulation mode of a bitstream of the free viewpoint video data is a single-track encapsulation mode, the encapsulation unit 12 is further configured to add the codec independence indication information to a free viewpoint information data box of the video track, where the value of the codec independence indication information is the third value or the fourth value.

In some embodiments, in a case that the encoding manner of the free viewpoint video data is the AVS3 encoding mode, the encapsulation unit 12 is further configured to encapsulate at least one of header information, texture map information corresponding to at least one viewpoint, and depth map information corresponding to at least one viewpoint required for decoding in the media file in a form of a subsample, where a subsample data box includes a subsample data box flag and subsample indication information, the subsample data box flag is configured to indicate a division manner of the subsample, and the subsample indication information is used for indicating content included in the sub sample.

In some embodiments, in a case that a value of the subsample indication information is a fifth value, it indicates that one subsample includes the header information required for decoding; or in a case that a value of the subsample indication information is a sixth value, it indicates that one subsample includes texture map information corresponding to N viewpoints in a current video frame, and the current video frame is stitched from video frames corresponding to the N viewpoints; or in a case that a value of the subsample indication information is a seventh value, it indicates that one subsample includes depth map information corresponding to N viewpoints in a current video frame; or in a case that a value of the subsample indication information is an eighth value, it indicates that one subsample includes texture map information and depth map information corresponding to one viewpoint in a current video frame; or in a case that a value of the subsample indication information is a ninth value, it indicates that one subsample includes texture map information corresponding to one viewpoint in a current video frame; or in a case that a value of the subsample indication information is a tenth value, it indicates that one subsample includes depth map information corresponding to one viewpoint in a current video frame.

In some embodiments, in a case that the encoding manner of the free viewpoint video data is the AVS3 encoding mode, the video data corresponding to each of the N viewpoints does not depend on the video data corresponding to other views during encoding, and the encapsulation mode of the bitstream of the free viewpoint video data is the single-track encapsulation mode, the encapsulation unit 12 is specifically configured to encapsulate the texture map information and the depth map information corresponding to each of the N viewing angles in the media file in the form of subsamples.

It is to be understood that, the apparatus embodiment and the method embodiment may correspond to each other. For a similar description, reference may be made to the method embodiment. To avoid repetition, details are not described herein again. Specifically, the apparatus 10 shown in FIG. 8 may perform the method embodiment corresponding to the first device, and each module and other operations and/or functions in the apparatus 8 are respectively intended to implement the method embodiment corresponding to the first device. For brevity, details are not repeated herein.

Figure 9:
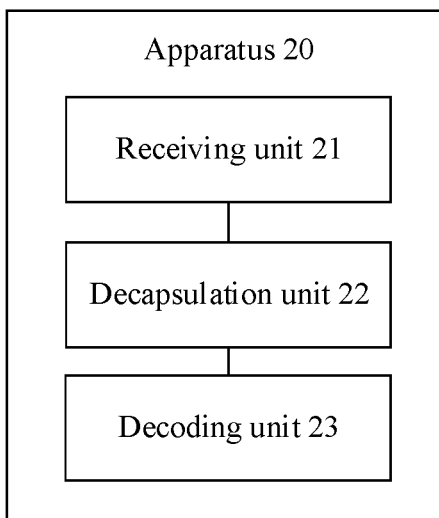
FIG. 9 is a schematic diagram of a structure of a file encapsulation apparatus for a free viewpoint video according to an embodiment of this disclosure.

FIG. 9 is a schematic diagram of a structure of a file encapsulation apparatus for a free viewpoint video according to an embodiment of this disclosure. The apparatus 20 is applied to a client, and the apparatus 20 includes:

a receiving unit 21, configured to receive a media file of free viewpoint video data sent by a first device, the media file including at least one video track, the free viewpoint video data including video data of N viewpoints, N being a positive integer, the video track including codec independence indication information and video bitstreams of M viewpoints, the codec independence indication information being used for indicating whether video data of a single viewpoint in M viewpoints corresponding to the video track depends on video data of other viewpoints during codec, and M being a positive integer less than or equal to N;

a decapsulation unit 22, configured to decapsulate the media file according to the codec independence indication information, to obtain a video bitstream corresponding to at least one viewpoint; and a decoding unit 23, configured to decode the video bitstream corresponding to the at least one viewpoint, to obtain reconstructed video data of the at least one viewpoint.

In an embodiment, the video data includes at least one of texture map data and depth map data.

In some embodiments, in a case that a value of the codec independence indication information is a first value, it indicates that texture map data of the single viewpoint depends on texture map data and depth map data of other views during codec, or depth map data of the single viewpoint depends on texture map data and depth map data of other views during codec; or in a case that a value of the codec independence indication information is a second value, it indicates that texture map data of the single viewpoint depends on texture map data of other views during codec, and depth map data of the single viewpoint depends on depth map data of other views during codec; or in a case that a value of the codec independence indication information is a third value, it indicates that texture map data and depth map data of the single viewpoint do not depend on texture map data and depth map data of other views during codec, and the texture map data and the depth map data of the single viewpoint depend on each other during codec; or in a case that a value of the codec independence indication information is a fourth value, it indicates that texture map data and depth map data of the single viewpoint do not depend on texture map data and depth map data of other viewpoints during codec, and the texture map data and the depth map data of the single viewpoint do not depend on each other during codec.

In some embodiments, the decapsulation unit 22 is configured to obtain a viewing angle of a user in a case that the value of the codec independence indication information is the third value or the fourth value, and an encapsulation mode of the bitstream is a single-track encapsulation mode; determine a target viewpoint according to the viewing angle of the user and viewpoint information in the media file; and decapsulate a media file corresponding to the target viewpoint, to obtain a video bitstream corresponding to the target viewpoint.

In some embodiments, in a case that an encoding manner of the free viewpoint video data is an AVS3 video encoding manner, and the media file includes a subsample, according to the codec independence indication information, the decapsulation unit 22 is configured to obtain a subsample data box flag and the subsample indication information included in a subsample data box, where the subsample data box flag is configured to indicate a division manner of the subsample, the subsample indication information is used for indicating content included in the subsample, the content included in the subsample includes at least one of header information, texture map information corresponding to at least one viewpoint, and depth map information corresponding to at least one viewpoint required for decoding; obtain the content included in the subsample according to the subsample data box flag and the subsample indication information; and decapsulate the media file resource according to the content included in the subsample and the codec independence indication information, to obtain the video bitstream corresponding to the at least one viewpoint.

In some embodiments, in a case that a value of the subsample indication information is a fifth value, it indicates that one subsample includes the header information required for decoding; or in a case that a value of the subsample indication information is a sixth value, it indicates that one subsample includes texture map information corresponding to N viewpoints in a current video frame; or in a case that a value of the subsample indication information is a seventh value, it indicates that one subsample includes depth map information corresponding to N viewpoints in a current video frame; or in a case that a value of the subsample indication information is an eighth value, it indicates that one subsample includes texture map information and depth map information corresponding to one viewpoint in a current video frame; or in a case that a value of the subsample indication information is a ninth value, it indicates that one subsample includes texture map information corresponding to one viewpoint in a current video frame; or in a case that a value of the subsample indication information is a tenth value, it indicates that one subsample includes depth map information corresponding to one viewpoint in a current video frame.

In some embodiments, if the media file includes a subsample corresponding to each of the N viewpoints, the decapsulation unit 22 is specifically configured to determine the target viewpoint according to the viewing angle of the user and the viewpoint information in the media file in a case that the value of the codec independence indication information is the third value or the fourth value, and the encapsulation mode of the bitstream is the single-track encapsulation mode; obtain the subsample data box flag and the subsample indication information included in a target subsample data box corresponding to the target viewpoint; determine content comprised in the target subsample according to the subsample data box flag and the subsample indication information included in the target subsample data box; and decapsulating a media file corresponding to the target viewpoint according to the content comprised in the target subsample, to obtain the video bitstream corresponding to the target viewpoint.

It is to be understood that, the apparatus embodiment and the method embodiment may correspond to each other. For a similar description, reference may be made to the method embodiment. To avoid repetition, details are not described herein again. Specifically, the apparatus 20 shown in FIG. 9 may perform the method embodiment corresponding to the client, and each module and other operations and/or functions in the apparatus 20 are respectively intended to implement the method embodiment corresponding to the client. For brevity, details are not repeated herein.

Figure 10:
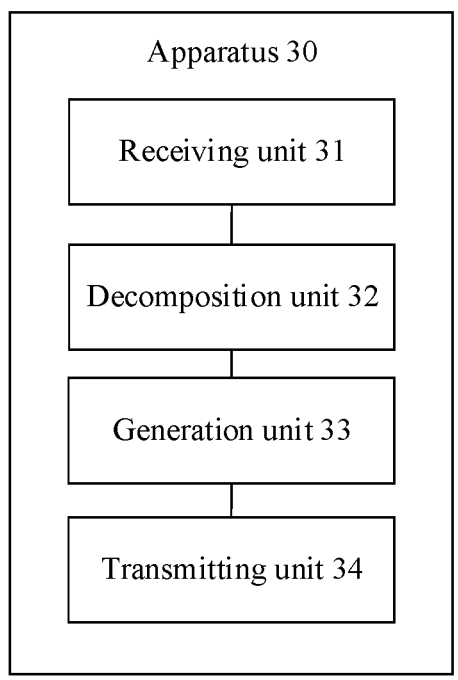
FIG. 10 is a schematic diagram of a structure of a file encapsulation apparatus for a free viewpoint video according to an embodiment of this disclosure.

FIG. 10 is a schematic diagram of a structure of a file encapsulation apparatus for a free viewpoint video according to an embodiment of this disclosure. The apparatus 30 is applied to a server, and the apparatus 30 includes:

- a receiving unit 31, configured to receive a media file of free viewpoint video data sent by a first device, the media file including at least one video track, the free viewpoint video data including video data of N viewpoints, N being a positive integer, the video track including codec independence indication information and video bitstreams of M viewpoints, the codec independence indication information being used for indicating whether video data of a single viewpoint in M viewpoints corresponding to the video track depends on video data of other viewpoints during codec, and M being a positive integer less than or equal to N;
- a decomposition unit 32, configured to determine whether to decompose the at least one video track into a plurality of video tracks according to the codec independence indication information.

In an embodiment, the video data includes at least one of texture map data and depth map data.

In some embodiments, in a case that a value of the codec independence indication information is a first value, it indicates that texture map data of the single viewpoint depends on texture map data and depth map data of other views during codec, or depth map data of the single viewpoint depends on texture map data and depth map data of other views during codec; or

- in a case that a value of the codec independence indication information is a second value, it indicates that texture map data of the single viewpoint depends on texture map data of other views during codec, and depth map data of the single viewpoint depends on depth map data of other views during codec; or
- in a case that a value of the codec independence indication information is a third value, it indicates that texture map data and depth map data of the single viewpoint do not depend on texture map data and depth map data of other views during codec, and the texture map data and the depth map data of the single viewpoint depend on each other during codec; or
- in a case that a value of the codec independence indication information is a fourth value, it indicates that texture map data and depth map data of the single viewpoint do not depend on texture map data and depth map data of other viewpoints during codec, and the texture map data and the depth map data of the single viewpoint do not depend on each other during codec.

In some embodiments, in a case that the value of the codec independence indication information is the third value or the fourth value, and an encapsulation mode of the bitstream is a single-track encapsulation mode, the decomposition unit 32 is specifically configured to encapsulate one video track formed in the single-track encapsulation mode into N video tracks according to the multi-track encapsulation mode, and each video track in the N video tracks includes the video data corresponding to the single viewpoint.

In some embodiments, in a case that the encoding manner is an AVS3 video encoding manner, the media file includes a subsample corresponding to each of the N viewpoints, and the subsample corresponding to each viewpoint includes at least one of the depth map information and the texture map information corresponding to each viewpoint, the decomposition unit 32 is specifically configured to obtain, for each of the N viewpoints, the subsample data box flag included in the subsample data box corresponding to the viewpoint and the subsample indication information, where the subsample data box flag is configured to indicate a division manner of the subsample, and the subsample indication information is used for indicating content included in the subsample; obtain the content included in the subsample corresponding to each viewpoint according to the subsample data box flag corresponding to each viewpoint and the subsample indication information; and according to the content included in the subsample corresponding to each viewpoints, encapsulate one video track formed in the single-track encapsulation mode into N video tracks according to the multi-track encapsulation mode.

In some embodiments, the apparatus further includes a generation unit 33 and a transmitting unit 34.

The generating unit 33 is configured to generate first signaling, and the first signaling includes at least one of an identifier of a camera corresponding to each track in the N video tracks, location information of the camera, and focus information of the camera;

- the transmitting unit 34 is configured to transmit the first signaling to a client;
- a receiving unit 31 is further configured to receive first request information determined by the client according to the first signaling, where the first request information includes identification information of the target camera; and
- the transmitting unit 34 is further configured to transmit a media file corresponding to the target camera to the client according to the first request information.

It is to be understood that, the apparatus embodiment and the method embodiment may correspond to each other. For a similar description, reference may be made to the method embodiment. To avoid repetition, details are not described herein again. Specifically, the apparatus shown in FIG. 10 may perform the method embodiment corresponding to the server, and each module and other operations and/or functions in the apparatus 30 are respectively intended to implement the method embodiment corresponding to the server. For brevity, details are not repeated herein.

The apparatus in the embodiments of this disclosure is described above from the perspective of functional modules with reference to the accompanying drawings. It is to be understood that the functional module may be implemented in the form of hardware, may also be implemented by instructions in the form of software, and may also be implemented by a combination of hardware and software modules. Specifically, each step of the method embodiment in the embodiments of this disclosure may be completed by an integrated logic circuit of hardware in the processor (processing circuitry) and/or instructions in the form of software. The steps of the method disclosed in the embodiments of this disclosure may be directly embodied as being executed by a hardware decoding processor, or may be performed and completed by using a combination of hardware and software modules in the decoding processor. The software module may be stored in a non-transitory storage medium that is mature in the art, such as a RAM, a flash memory, a ROM, a programmable ROM, an electrically erasable programmable memory, or a register. The storage medium is located in the memory. The processor reads information in the memory and completes the steps of the method embodiments in combination with hardware thereof.

Figure 11:
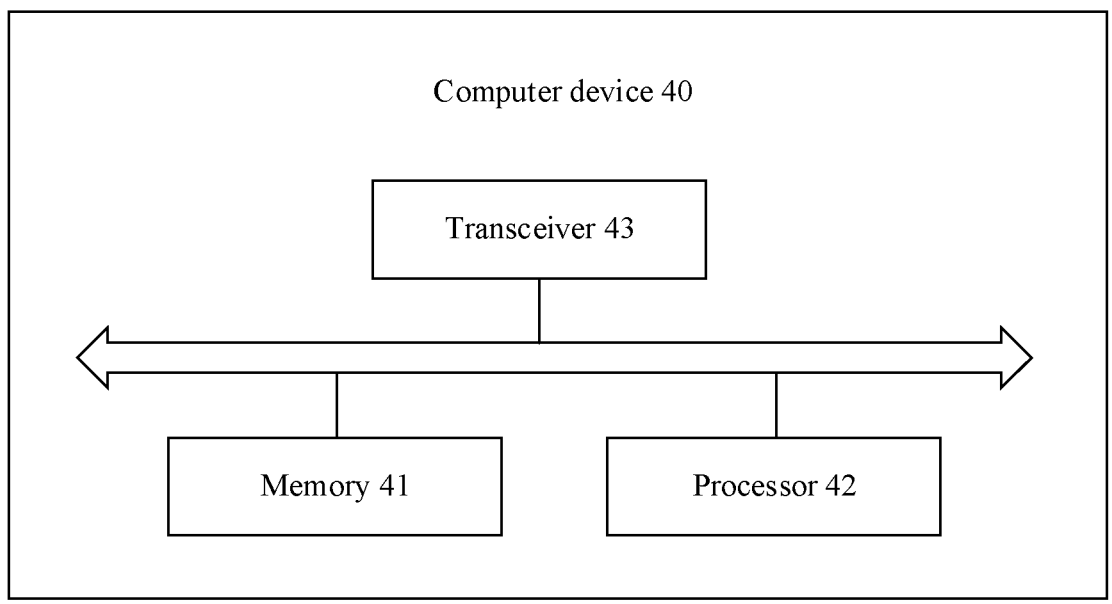
FIG. 11 is a schematic block diagram of a computer device according to an embodiment of this disclosure.

FIG. 11 is a schematic block diagram of a computer device according to an embodiment of this disclosure. The computer device may be the first device, server, or client.

As shown in FIG. 11, the computer device 40 may include:

- a memory 41 and memory 42. The memory 41 is configured to store a computer program, and transmit the program code to the memory 42. In other words, the memory 42 may invoke the computer program from the memory 41 and run the computer program, to implement the method in the embodiments of this disclosure.

For example, the memory 42 may be configured to perform the method embodiment according to the instruction in the computer program.

In some embodiments of this disclosure, the memory 42 may include, but is not limited to:

- a general-purpose processor, a digital signal processor (DSP), an application-specific integrated circuit (ASIC), a field programmable gate array (FPGA), or another programmable logical device, discrete gate or transistor logical device, or discrete hardware component.

In some embodiments of this disclosure, the memory 41 includes, but is not limited to:

- a non-volatile memory and/or a volatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

In some embodiments of this disclosure, the computer program may be divided into one or more modules, and the one or more modules are stored in the memory 41 and executed by the memory 42 to complete the method provided in this disclosure. The one or more modules may be a series of computer program instruction segments capable of accomplishing specific functions, and the instruction segments are used for describing an execution process of the computer program in the video production device.

As shown in FIG. 11, the computer device 40 may further include:

- a transceiver 40. The transceiver 43 may be connected to a memory 42 or a memory 41.

The processor 42 may control the transceiver 43 to communicate with another device. Specifically, the transceiver 43 transmits information or data to another device, or receives information or data sent by another device. The transceiver 43 may include a transmitter and a receiver. The transceiver 43 may further include an antenna, and a number of the antenna can be one or more.

It is to be understood that various components in the video production device are connected through a bus system, where in addition to a data bus, the bus system further includes a power supply bus, a control bus, and a status signal bus.

This disclosure further provides a computer storage medium, where the computer storage medium stores a computer program, and the computer program, when executed by a computer, enables the computer to perform the method in the foregoing method embodiments.

The embodiments of this disclosure further provide a computer program product including instructions, the instructions, when executed by a computer, enable the computer to perform the method in the foregoing method embodiments.

When the software is used for implementation, all or some of the embodiments may be implemented in a form of a computer program product. The computer program product includes one or more computer instructions. When the computer program instructions are loaded and executed on the computer, the procedures or functions according to the embodiments of this disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may be aware that, in combination with the examples described in the embodiments disclosed in this specification, modules and algorithm steps may be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this disclosure.

In the several embodiments provided in this disclosure, it is to be understood that the disclosed system, apparatus, and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network units. A part or all of the modules may be selected according to actual requirements to achieve the objectives of the solutions of the embodiments of the present disclosure. For example, functional modules in the embodiments of in this disclosure may be integrated into one processing module, or each of the modules may exist alone physically, or two or more modules are integrated into one module.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A file decapsulation method for a free viewpoint video, the method comprising:
   receiving a media file of free viewpoint video data sent by a first device, the media file comprising a video track, the free viewpoint video data comprising video data of N viewpoints of a current video frame, N being a positive integer, the video track comprising codec independence indication information and video bitstreams of M viewpoints, the codec independence indication information indicating whether video data of one of the M viewpoints in the video track depends on video data of a plurality of other viewpoints of the M viewpoints in the video track, and M being a positive integer less than or equal to N;
   decapsulating the media file according to the codec independence indication information, to obtain a video bitstream corresponding to at least one of the M viewpoints; and
   decoding the video bitstream corresponding to the at least one of the M viewpoints, to obtain reconstructed video data of the at least one of the M viewpoints, wherein the codec independence indication information indicates whether texture map data of the one of the M viewpoints in the video track depends on both (i) texture map data and (ii) depth map data of the plurality of other viewpoints of the M viewpoints in the video track.

2. The method according to claim 1, wherein the video data comprises at least one of the texture map data and the depth map data.

3. The method according to claim 1, wherein, when a value of the codec independence indication information is a first value, the texture map data of the one of the M viewpoints depends on the texture map data and the depth map data of the plurality of other viewpoints, or depth map data of the one of the M viewpoints depends on the texture map data and the depth map data of the plurality of other viewpoints.

4. The method according to claim 1, wherein, when a value of the codec independence indication information is a second value, the texture map data of the one of the M viewpoints depends on the texture map data of the plurality of other viewpoints, and depth map data of the one of the M viewpoints depends on the depth map data of the plurality of other viewpoints.

5. The method according to claim 1, wherein, when a value of the codec independence indication information is a third value, the texture map data and depth map data of the one of the M viewpoints do not depend on the texture map data and the depth map data of the plurality of other viewpoints, and the texture map data and the depth map data of the one of the M viewpoints depend on each other.

6. The method according to claim 1, wherein, when a value of the codec independence indication information is a fourth value, the texture map data and depth map data of the one of the M viewpoints do not depend on the texture map data and the depth map data of the plurality of other viewpoints during codec, and the texture map data and the depth map data of the one of the M viewpoints do not depend on each other.

7. The method according to claim 6, wherein the decapsulating the media file comprises:
   obtaining a viewing angle of a user in response to a determination that the value of the codec independence indication information is a third value or the fourth value, and an encapsulation mode of the video bitstream is a single-track encapsulation mode;
   selecting a viewpoint according to the viewing angle of the user and viewpoint information in the media file; and
   decapsulating a media file corresponding to the selected viewpoint, to obtain a video bitstream corresponding to the selected viewpoint.

8. The method according to claim 7, wherein, in response to a determination that an encoding manner of the free viewpoint video data is an AVS3 video encoding manner, and the media file comprises a subsample, the decapsulating the media file comprises:
   obtaining a subsample data box flag and subsample indication information, wherein the subsample data box flag indicates a division manner of the subsample, the subsample indication information indicates content type of the subsample, including at least one of header information, texture map information corresponding to at least one viewpoint, or depth map information corresponding to at least one viewpoint;
   obtaining the content of the subsample according to the subsample data box flag and the subsample indication information; and
   decapsulating the media file according to the content of the subsample and the codec independence indication information, to obtain the video bitstream corresponding to the at least one of the M viewpoints.

9. The method according to claim 8, wherein
when a value of the subsample indication information is a fifth value, the subsample comprises the header information.

10. The method according to claim 8, wherein, when a value of the subsample indication information is a sixth value, the subsample comprises texture map information corresponding to the N viewpoints in the current video frame, and the current video frame is stitched from video frames corresponding to the N viewpoints.

11. The method according to claim 8, wherein, when a value of the subsample indication information is a seventh value, the subsample comprises depth map information corresponding to the N viewpoints in the current video frame.

12. The method according to claim 8, wherein, when a value of the subsample indication information is an eighth value, the subsample comprises texture map information and depth map information corresponding to one viewpoint of the N viewpoints in the current video frame.

13. The method according to claim 8, wherein, when a value of the subsample indication information is a ninth value, the subsample comprises texture map information corresponding to one viewpoint of the N viewpoints in the current video frame.

14. The method according to claim 8, wherein, when a value of the subsample indication information is a tenth value, the subsample comprises depth map information corresponding to one viewpoint of the N viewpoints in the current video frame.

15. The method according to claim 8, wherein, when the media file comprises a subsample corresponding to each of the N viewpoints, the decapsulating the media file comprises:
selecting the viewpoint according to the viewing angle of the user and the viewpoint information in the media file when the value of the codec independence indication information is the third value or the fourth value, and the encapsulation mode of the video bitstream is the single-track encapsulation mode;
obtaining the subsample data box flag and the subsample indication information of a target subsample corresponding to the selected viewpoint;
determining content of the target subsample according to the subsample data box flag and the subsample indication information; and
decapsulating a media file corresponding to the selected viewpoint according to the content of the target subsample, to obtain the video bitstream corresponding to the selected viewpoint.

16. A file encapsulation method for a free viewpoint video, the method comprising:
obtaining a bitstream of free viewpoint video data, the free viewpoint video data comprising video data of N viewpoints of a current video frame, and N being a positive integer;
encapsulating the bitstream of the free viewpoint video data into a video track, to obtain a media file of the free viewpoint video data, the video track comprising codec independence indication information and video bitstreams of M viewpoints, the codec independence indication information indicating whether texture map data of one of the M viewpoints in the video track depends on both (i) texture map data and (ii) depth map data of a plurality of other viewpoints of the M viewpoints in the video track, and M being a positive integer less than or equal to N; and
transmitting the media file of the free viewpoint video data to a client or a server.

17. The method according to claim 16, wherein
when a value of the codec independence indication information is a first value, the texture map data of the one of the M viewpoints depends on the texture map data and the depth map data of the plurality of other viewpoints during codec, or depth map data of the one of the M viewpoints depends on the texture map data and the depth map data of the plurality of other viewpoints during codec;
when the value of the codec independence indication information is a second value, the texture map data of the one of the M viewpoints depends on the texture map data of the plurality of other viewpoints during codec, and the depth map data of the one of the M viewpoints depends on the depth map data of the plurality of other viewpoints during codec;
when the value of the codec independence indication information is a third value, the texture map data and the depth map data of the one of the M viewpoints do not depend on the texture map data and the depth map data of the plurality of other viewpoints during codec, and the texture map data and the depth map data of the one of the M viewpoints depend on each other during codec; and
when the value of the codec independence indication information is a fourth value, the texture map data and the depth map data of the one of the M viewpoints do not depend on the texture map data and the depth map data of the plurality of other viewpoints during codec, and the texture map data and the depth map data of the one of the M viewpoints do not depend on each other during codec.

18. The method according to claim 17, wherein, when video data corresponding to each of the N viewpoints does not depend on video data corresponding to the plurality of other viewpoints during encoding, and an encapsulation mode of the bitstream of the free viewpoint video data is a single-track encapsulation mode, the method further comprises:
adding the codec independence indication information to a free viewpoint information data box of the video track, wherein the value of the codec independence indication information is the third value or the fourth value.

19. The method according to claim 17, wherein, in response to a determination that an encoding manner of the free viewpoint video data is an AVS3 encoding mode, the method further comprises:
encapsulating at least one of header information, texture map information corresponding to at least one viewpoint, or depth map information corresponding to at least one viewpoint in the media file in a form of a subsample, wherein
a subsample data box of the subsample comprises a subsample data box flag and subsample indication information, the subsample data box flag indicating a division manner of the subsample, and the subsample indication information indicating a content type comprised in the subsample.

20. A file decapsulation apparatus for a free viewpoint video, the apparatus comprising:
processing circuitry configured to
receive a media file of free viewpoint video data sent by a first device, the media file comprising a video track, the free viewpoint video data comprising video data of N viewpoints of a current video frame, N being a positive integer, the video track comprising codec independence indication information and video bitstreams of M viewpoints, the codec independence indication information indicating whether video data of one of the M viewpoints in the video track depends on video data of a plurality of other viewpoints of the M viewpoints in the video track, and M being a positive integer less than or equal to N;
decapsulate the media file according to the codec independence indication information, to obtain a video bitstream corresponding to at least one of the M viewpoints; and
decode the video bitstream corresponding to the at least one of the M viewpoints, to obtain reconstructed video data of the at least one of the M viewpoints, wherein the codec independence indication information indicates whether texture map data of the one of the M viewpoints in the video track depends on both (i) texture map data and (ii) depth map data of the plurality of other viewpoints of the M viewpoints in the video track.

\* \* \* \* \*